United States Patent
Jiang et al.

(10) Patent No.: US 9,380,678 B2
(45) Date of Patent: Jun. 28, 2016

(54) AUXILIARY POWER SUPPLY CIRCUIT OF TWO WIRE DIMMER

(75) Inventors: Delai Jiang, Hangzhou (CN); Jianhua Zou, Hangzhou (CN); Guichao Hua, Hangzhou (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 254 days.

(21) Appl. No.: 14/008,438

(22) PCT Filed: Aug. 29, 2011

(86) PCT No.: PCT/CN2011/079055
§ 371 (c)(1),
(2), (4) Date: Sep. 27, 2013

(87) PCT Pub. No.: WO2012/136042
PCT Pub. Date: Oct. 11, 2012

(65) Prior Publication Data
US 2014/0021875 A1    Jan. 23, 2014

(30) Foreign Application Priority Data
Apr. 2, 2011 (CN) .......................... 2011 1 0083933

(51) Int. Cl.
*H05B 37/00* (2006.01)
*H05B 39/00* (2006.01)
(Continued)

(52) U.S. Cl.
CPC ............... *H05B 37/02* (2013.01); *H02M 1/081* (2013.01); *H02M 5/293* (2013.01); *H05B 39/04* (2013.01); *H02M 2001/0006* (2013.01)

(58) Field of Classification Search
USPC .......................................... 315/200 R–200 A
See application file for complete search history.

(56) References Cited

U.S. PATENT DOCUMENTS 6,437,519 B1 * 8/2002 Ito .................... H05B 41/2883
315/291
7,242,150 B2   7/2007 DeJonge et al.
(Continued)

FOREIGN PATENT DOCUMENTS

CN      1166077 A    11/1997
CN    101171885 A     4/2008
(Continued)

OTHER PUBLICATIONS

International Search Report (in Chinese with English translation) and Written Opinion (in Chinese for PCT/CN2011/079055, mailed Feb. 2, 2012; ISA/CN.
(Continued)

*Primary Examiner* — Brandon S Cole
(74) *Attorney, Agent, or Firm* — Harness, Dickey & Pierce, P.L.C.

(57) ABSTRACT

An auxiliary power supply circuit of a two wire dimmer, comprising: an auxiliary source capacitor (20) and a cutoff switch (30) constituting a series branch, a chopper switch (10) parallel-connected to the series branch, and a control device (40) connected to the chopper switch (10) and to the cutoff switch (30). The control device (40) measures an auxiliary source voltage and receives a chopper voltage control signal (Vg), and outputs signals (V1 and V2), on the basis of the result of a comparison between the auxiliary source voltage and a preset voltage and of the state of the chopper voltage control signal (Vg), to control the on and off of the chopper switch (10) and of the cutoff switch (30) for controlling the charging of the auxiliary source capacitor (20). The auxiliary power supply circuit has low losses, high efficiency, and is not limited by minimum chopper angle, and has low electromagnetic interference.

6 Claims, 10 Drawing Sheets

(51) Int. Cl.
*H05B 41/14* (2006.01)
*H05B 37/02* (2006.01)
*H02M 1/08* (2006.01)
*H02M 5/293* (2006.01)
*H05B 39/04* (2006.01)
*H02M 1/00* (2006.01)

(56) References Cited

U.S. PATENT DOCUMENTS

| | | | |
|---|---|---|---|
| RE42,425 E | 6/2011 | DeJonge et al. | |
| 2006/0255745 A1* | 11/2006 | DeJonge | H05B 39/048 315/209 R |
| 2009/0200951 A1* | 8/2009 | King | H05B 41/3922 315/206 |
| 2010/0277093 A1* | 11/2010 | Braun | H05B 41/2851 315/291 |
| 2011/0248647 A1* | 10/2011 | Hiramatu | H02M 3/156 315/294 |
| 2012/0081032 A1* | 4/2012 | Huang | H05B 33/0815 315/294 |
| 2012/0286681 A1* | 11/2012 | Hausman, Jr. | H05B 41/2828 315/200 R |
| 2012/0286689 A1* | 11/2012 | Newman, Jr. | H05B 41/2828 315/246 |
| 2015/0230301 A1* | 8/2015 | Saby | H05B 33/0815 315/307 |

FOREIGN PATENT DOCUMENTS

| | | |
|---|---|---|
| CN | 201188713 Y | 1/2009 |
| CN | 201995178 U | 9/2011 |
| CN | 202085346 U | 12/2011 |
| CN | 202103575 U | 1/2012 |
| CN | 102651925 A | 8/2012 |
| JP | 3584522 B2 | 11/2004 |

OTHER PUBLICATIONS

First Chinese Office Action regarding Application No. 201110083933.8 dated Mar. 11, 2014. Partial translation provided by Unitalen Attorneys at Law.

* cited by examiner

AUXILIARY POWER SUPPLY CIRCUIT OF TWO WIRE DIMMER

CROSS-REFERENCE TO RELATED APPLICATIONS

This application is a National Stage application of PCT international application PCT/CN2011/079055, filed on Aug. 29, 2011 which claims the priority to Chinese patent application No. 201110083933.8, titled "AUXILIARY POWER SUPPLY CIRCUIT OF TWO WIRE DIMMER", filed with the State Intellectual Property Office on Apr. 2, 2011, both of which are incorporated herein by reference in their entirety.

FIELD OF THE INVENTION

The present invention relates to the technical field of auxiliary power supply, and in particular to an auxiliary power supply circuit of a two-wire dimmer.

BACKGROUND OF THE INVENTION

A dimmer is an electrical apparatus used to change luminous flux and adjust illumination level for a light source in an illumination apparatus. The dimmer is usually connected between a hot and a dimmed hot to adjust light by changing the effective value of the input current of a light source.

The commonly-used dimmer has only two wires to connect with the hot and the dimmed hot, therefore, the dimmer is referred to as a two-wire dimmer. In the two-wire dimmer, a semiconductor power device such as a MOSFET (Metal-Oxide-Semiconductor Field-Effect Transistor), an IGBT (Insulated Gate Bipolar Transistor) or a thyristor may be adopted as a chopper switch. The power network voltage may be controlled by controlling the chopper switch to be on or off. The magnitude of the chopper angle by the chopper switch indicates the level of the light-adjusting signal.

In order to meet requirements of a color lighting system, the two-wire dimmer is required to adjust light in multiple ways such as adjust the color and/or brightness. Generally, there are many circuits in the two-wire dimmer, and even a digital controlling such as a microcontroller is needed. Therefore, an auxiliary power supply for powering the microcontroller or other circuits is needed in the two-wire dimmer.

FIG. 1 is a diagram of an auxiliary power supply circuit of a two-wire dimmer in the prior art. In a case that both chopper switches 110 and 112 are turned off, the auxiliary power supply 124 in the circuit charges the capacitor C1 by using voltage drop generated when the chopper switches are turned off. In the positive half period of the sinusoidal wave, a charging loop is formed by the diode D1, the capacitor C1, the body diode of the chopper switch 112 and the load; in the negative half period of the sinusoidal wave, a charging loop is formed by the diode D2, the capacitor C1, the body diode of the chopper switch 110 and the load. Then an auxiliary voltage Vcc is obtained by voltage regulation of the auxiliary power supply 124.

Since the auxiliary voltage Vcc is obtained by using the voltage generated due to the turn-off of the chopper switches, the minimum chopper angle is needed in order to obtain the minimum auxiliary voltage (the chopper switch is turned off). However, even the chopper switch is off in a very short time (very small angle), a significant electromagnetic interference will be brought into the circuit due to abrupt change of the voltage and the current. In addition, the capacitor C1 may suffer from a peak voltage of the power network voltage, which is converted into a low voltage signal Vcc after passing through the auxiliary power supply 124, to power other circuits, resulting in a high cost and a low efficiency.

SUMMARY OF THE INVENTION

In view of the above, an object of the present invention is to provide an auxiliary power supply circuit of a two-wire dimmer, by which the defects in the prior art can be solved with a simple circuit and a low cost.

In order to achieve the above object, the following solution is provided according to the present invention: an auxiliary power supply circuit of a two-wire dimmer, including an auxiliary source capacitor and a disconnecting switch connected in series to form a series branch, a chopper switch connected in parallel with the series branch, and a control device connected to the chopper switch and the disconnecting switch;

the control device is configured to detect an auxiliary source voltage and receive a chopper voltage control signal, output a signal to control the chopper switch and the disconnecting switch to be on or off according to a comparison result of the auxiliary source voltage with a preset voltage and a state of the chopper voltage control signal, to control charging of the auxiliary source capacitor.

Another auxiliary power supply circuit of a two-wire dimmer is further provided according to the present invention, including an auxiliary source capacitor and a disconnecting switch connected in series to form a series branch, a chopper switch connected in parallel with the series branch, and a control device connected to the chopper switch and the disconnecting switch;

the control device is configured to detect an auxiliary source voltage and receive a chopper period control signal and a chopper voltage control signal, judge whether the chopper switch is in a chopper period according to the chopper period control signal, output a signal to control the chopper switch and the disconnecting switch to be on or off according to a comparison result of the auxiliary source voltage with a preset voltage, a state of the chopper voltage control signal and whether the chopper switch being in a chopper period, to control charging of the auxiliary source capacitor.

Another auxiliary power supply circuit of a two-wire dimmer is further provided according to the present invention, including a rectifier device and an auxiliary source capacitor connected in series to form a series branch, a disconnecting switch connected in parallel with the series branch to form a parallel branch, a chopper switch connected in series with the parallel branch, and a control device connected to the chopper switch and the disconnecting switch;

the control device is configured to detect an auxiliary source voltage and receive a chopper voltage control signal, and output a signal to control the disconnecting switch and the chopper switch to be on or off according to a comparison result of the auxiliary source voltage with a preset voltage and a state of the chopper voltage control signal, to charge the auxiliary source capacitor by the rectifier device.

Another auxiliary power supply circuit of a two-wire dimmer is further provided according to the present invention, including a rectifier device and an auxiliary source capacitor connected in series to form a series branch, a disconnecting switch connected in parallel with the series branch to form a parallel branch, a chopper switch connected in series with the parallel branch, and a control device connected to the chopper switch and the disconnecting switch;

the control device is configured to detect an auxiliary source voltage and receive a chopper voltage control signal and a chopper period control signal, judge whether the chopper switch is in a chopper period according to the chopper period control signal, and output a signal to control the disconnecting switch and the chopper switch to be on or off according to a comparison result of the auxiliary source voltage with a preset voltage, a state of the chopper voltage control signal and whether the chopper switch being in a chopper period, to control charging of the auxiliary source capacitor by the rectifier device.

Another auxiliary power supply circuit of a two-wire dimmer is further provided according to the present invention, including a first power supply branch and a second power supply branch, the first power supply branch includes a first auxiliary source capacitor and a first disconnecting switch connected in series to form a first series branch, and a first chopper switch connected in parallel with the first series branch;

the second power supply branch includes a rectifier device and a second auxiliary source capacitor connected in series to form a second series branch, a second disconnecting switch connected in parallel with the second series branch to form a parallel branch, and a second chopper switch connected in series with the parallel branch;

the auxiliary power supply circuit further includes a first control device for controlling the first power supply branch and a second control device for controlling the second power supply branch, the first control device is configured to detect an auxiliary source voltage of the first power supply branch and receive a first chopper voltage control signal or a first chopper period control signal, and output a signal to control the first chopper switch and the first disconnecting switch to be on or off according to a comparison result of the auxiliary source voltage of the first power supply branch with a preset voltage and a state of the first chopper voltage control signal or a state of the first chopper period control signal, to control charging of the first auxiliary source capacitor; and the second control device is configured to detect an auxiliary source voltage of the second power supply branch and receive a second chopper voltage control signal or a second chopper period control signal, and output a signal to control the second disconnecting switch and the second chopper switch to be on or off according to a comparison result of the auxiliary source voltage of the second power supply branch with a preset voltage and a state of the second chopper voltage control signal or a state of the second chopper period control signal, to charge the second auxiliary source capacitor by the rectifier device.

The following technical effects are provided by embodiments of the present invention.

In the circuits described in the embodiments of the invention, in a case that the auxiliary source voltage is lower than a preset value, at least one chopper switch is turned off, and the auxiliary source capacitor replaces the chopper switch turned off to form a loop together with the alternating current power supply and the output load of the two-wire dimmer, such that the alternating current power supply charges the auxiliary source capacitor to obtain an auxiliary source voltage; in a case that the auxiliary source voltage reaches a certain value, the chopper switch is turned on and operates in a saturation state, such that the alternating current power supply stops charging the auxiliary source capacitor to reduce the loss of the circuit; in a case that the two-wire dimmer is required to output a chopper voltage, the loop which charges the auxiliary source capacitor is cut off.

In the embodiments of the present invention, the chopper switch operates in a switch state instead of a linear state, so the loss of the auxiliary power supply circuit of the two-wire dimmer is small and the efficiency is high. In addition, the minimum chopper angle is not limited in the auxiliary power supply circuit of the two-wire dimmer, so the electromagnetic interference is small.

BRIEF DESCRIPTION OF THE DRAWINGS

The accompanying drawings to be used in the description of the embodiments will be described briefly below, to make technical solutions according to the embodiments of the present invention or the prior art clearer. It is obvious that the accompany drawings in the following description are only some embodiments of the present invention. Other accompany drawings may be obtained by those skilled in the art according to these accompany drawings without any creative work.

DETAILED DESCRIPTION OF THE INVENTION

The technical solutions according to the embodiments of the present invention will be described clearly and completely below in conjunction with the accompanying drawings of the embodiments of the present invention. It is obvious that the described embodiments are only part but not all of embodiments of the present invention. All other embodiments obtained by those skilled in the art based on the embodiments in the present invention without any creative work belong to the protection scope of the present invention.

In view of the above, an object of the present invention is to provide an auxiliary power supply circuit of a two-wire dimmer, to solve the defects in the prior art with a simple circuit and a lower cost.

In order to make the objects, features and advantages of the present invention more apparent and better understood, the present invention will be described in further detail below in conjunction with the accompanying drawings and the embodiments.

In the auxiliary power supply circuit of the two-wire dimmer according to the embodiments of the invention, in a case that the auxiliary source voltage is lower than a preset value, at least one chopper switch is turned off and the auxiliary source capacitor replaces the chopper switch turned off to form a loop together with the alternating current power supply and the output load of the two-wire dimmer, such that the alternating current power supply charges the auxiliary source capacitor to obtain an auxiliary source voltage; in a case that the auxiliary source voltage reaches a certain value, the chopper switch is turned on and operates in a saturation state, such that the alternating current power supply stops charging the auxiliary source capacitor, to reduce the loss of the circuit; in a case that the two-wire dimmer is required to output a chopper voltage, the loop which charges the auxiliary source capacitor is cut off.

The auxiliary power supply circuit of the two-wire dimmer according to the embodiments of the present invention includes a chopper switch, an auxiliary source capacitor and a disconnecting switch. The auxiliary source capacitor and the disconnecting switch are connected in series to form a series branch, and the chopper switch is connected in parallel with the series branch.

In a case that the disconnecting switch is on and the chopper switch is off, the auxiliary source capacitor is connected in parallel with the chopper switch and the auxiliary source capacitor is charged; in a case that the disconnecting switch is off or both the chopper switch and the disconnecting switch are on, the charging of the auxiliary source capacitor is stopped.

Figure 1:
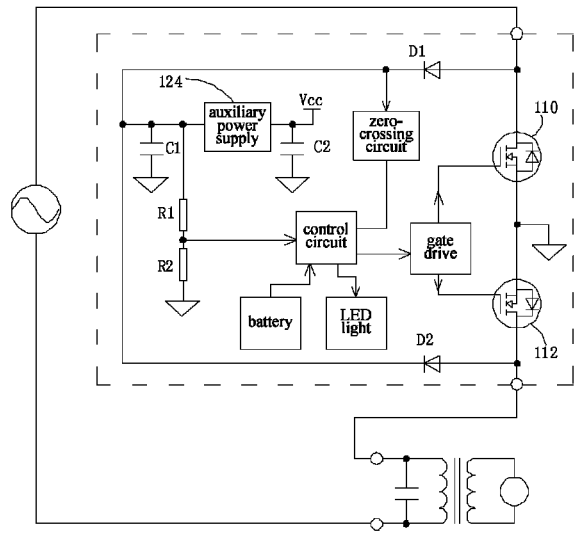
FIG. 1 is a diagram of an auxiliary power supply circuit of a two-wire dimmer in the prior art.
Figure 2:
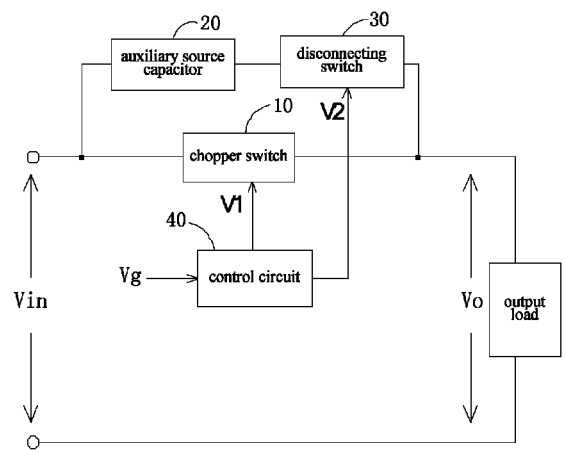
FIG. 2 is a structural diagram of an auxiliary power supply circuit of a two-wire dimmer according to a first embodiment of the present invention.

FIG. 2 is a structural diagram of an auxiliary power supply circuit of a two-wire dimmer according to a first embodiment of the present invention. The auxiliary power supply of the two-wire dimmer may include a chopper switch 10, an auxiliary source capacitor 20, a disconnecting switch 30 and a control device 40.

The auxiliary source capacitor 20 and the disconnecting switch 30 are connected in series to form a series branch, and the chopper switch 10 is connected in parallel with the series branch.

The two ends of the chopper switch 10 are respectively connected to an end of an input alternating current power supply Vin and an output load end which is not connected to the input alternating current power supply. The other end of the output load is connected to the other end of the input alternating current power supply.

In a case that the disconnecting switch 30 is on and the chopper switch 10 is off, the auxiliary source capacitor 20 is connected in parallel with the chopper switch 10 and the auxiliary source capacitor 20 is charged; in a case that the disconnecting switch 30 is off or both the chopper switch 10 and the disconnecting switch 30 are on, the charging of the auxiliary source capacitor 20 is stopped.

The control device 40 detects an auxiliary source voltage and receives a chopper voltage control signal Vg, to output a signal to control the chopper switch 10 and the disconnecting switch 20 to be on or off according to a comparison result of the auxiliary source voltage with a preset voltage and the state of the chopper voltage control signal Vg, so as to control the charging of the auxiliary source capacitor 20.

The two-wire dimmer outputs a chopper voltage or a non-chopper voltage. In a case that the chopper voltage is output, the chopper voltage is used for transferring an adjusting signal to a post-stage circuit by the two-wire dimmer.

It should be noted that in the embodiments of the present invention, the chopper voltage control signal (shown as Vg in FIG. 2) is a signal for controlling the output voltage of the two-wire dimmer.

In a case that the chopper voltage control signal Vg is turning off the chopper switch 10, the two-wire dimmer outputs a zero voltage; and in a case that the chopper voltage control signal Vg is not turning off the chopper switch 10, the two-wire dimmer outputs a non-zero voltage.

In a case that the chopper voltage control signal Vg is turning off the chopper switch 10, the two-wire dimmer is to output a zero voltage, therefore, the auxiliary source capacitor 20 is not charged. The control device 40 outputs a first signal V1 to control the chopper switch 10 to be off and outputs a second signal V2 to control the disconnecting switch 30 to be off, thus the two-wire dimmer outputs a zero voltage.

In a case that the chopper voltage control signal Vg is not turning off the chopper switch 10 and the auxiliary source voltage is lower than a lower limit value, the auxiliary source capacitor 20 needs to be charged. In this case, the control device 40 outputs a first signal V1 to control the chopper switch 10 to be off and outputs a second signal V2 to control the disconnecting switch 30 to be on. The voltage across the chopper switch 10 charges the auxiliary source capacitor 20 via the disconnecting switch 30. If the alternating current input voltage Vin is a power network voltage (for example, 110 Vac, 220 Vac or 277 Vac), the alternating current input voltage Vin is far greater than the voltage across the chopper switch 10 since the auxiliary source voltage is generally controlled to be a voltage which ranges from 0 to 20 volts.

Therefore, the output voltage V0 of the two-wire dimmer is the difference between the input alternating current voltage Vin and the voltage across the chopper switch 10, and thus is a non-zero voltage.

In a case that the chopper voltage control signal Vg is not turning off the chopper switch 10 and the auxiliary source voltage is higher than an upper limit value, the auxiliary source capacitor 20 does not need to be charged. In this case, the control device 40 outputs a first signal V1 to control the chopper switch 10 to be on and outputs a second signal V2 to control the disconnecting switch 30 to be off, and the output voltage of the two-wire dimmer is the alternating current input voltage Vin, which is a non-zero voltage.

The implementation of the auxiliary power supply circuit of the two-wire dimmer according to the first embodiment of the present invention will be described in detail below.

In a first implementation of the auxiliary power supply circuit of the two-wire dimmer according to the first embodiment of the present invention, the control device may include a judging circuit and a disconnecting switch driving circuit.

The judging circuit is configured to receive a chopper voltage control signal and output a signal to control the chopper switch and the disconnecting switch to be off in a case that the chopper voltage control signal is turning off the chopper switch; detect an auxiliary source voltage, compare the auxiliary source voltage with a preset voltage, and output a signal to control the chopper switch to be off in a case that the auxiliary source voltage is lower than a set lower limit value and the chopper voltage control signal is not turning off the chopper switch; and output a signal to control the chopper switch to be on in a case that the auxiliary source voltage is higher than a set upper limit value and the chopper voltage control signal is not turning off the chopper switch.

The disconnecting switch driving circuit is configured to control the disconnecting switch to be on in a case that the chopper switch is off and the chopper voltage control signal is not turning off the chopper switch.

It should be noted that in a case that the chopper voltage control signal is turning off the chopper switch, the chopper switch and the disconnecting switch are directly controlled to be off; and in a case that the chopper voltage control signal is not turning off the chopper switch, the chopper switch and the disconnecting switch are not controlled to be on or off according to the chopper voltage control signal, but are controlled to be on or off according to signals at the control ends of the chopper switch and the disconnecting switch respectively.

In a case that the chopper voltage control signal controls the chopper switch or the disconnecting switch, the priority of the chopper voltage control signal is higher than the priority of the signal at the control end of the chopper switch or the disconnecting switch.

In a case that the judging circuit receives a chopper voltage control signal which is turning off the chopper switch, the judging circuit directly outputs a signal to control the chopper switch and the disconnecting switch to be off without considering a comparison result of the auxiliary source voltage with the preset voltage; and in a case that the judging circuit receives a chopper voltage control signal which is not turning off the chopper switch, the judging circuit controls the chopper switch and the disconnecting switch to be on or off according to a comparison result of the auxiliary source voltage with the preset voltage, specifically, the judging circuit outputs a signal to control the chopper switch to be off in a case that the auxiliary source voltage is lower than a set lower limit value, and outputs a signal to control the chopper switch to be on in a case that the auxiliary source voltage is higher than a set upper limit value.

Figure 3:
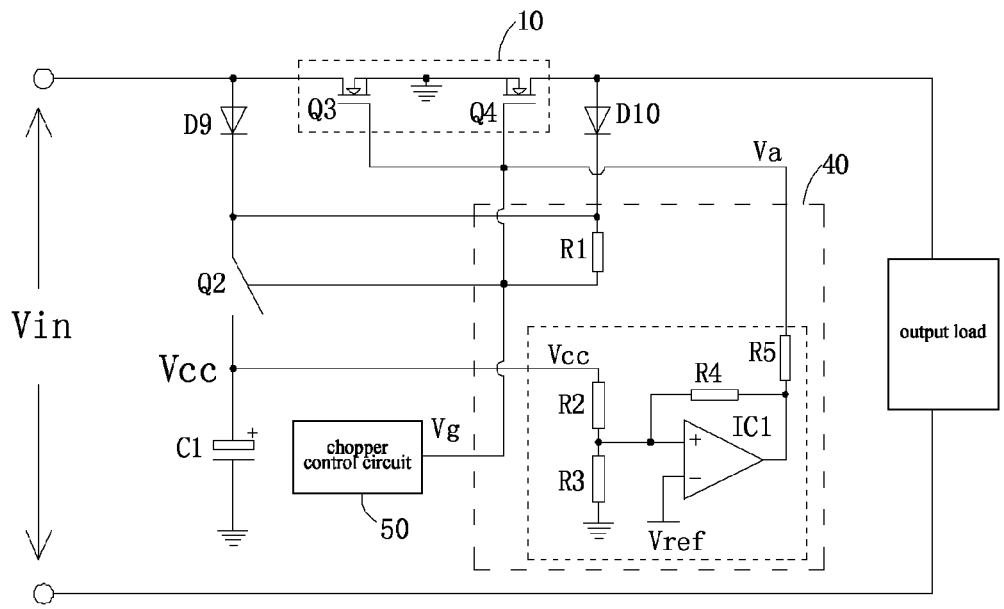
FIG. 3 is a circuit diagram of a first implementation of a control device of the auxiliary power supply circuit according to the first embodiment of the present invention.

The first implementation of the control device of the auxiliary power supply circuit according to the first embodiment of the present invention may be as the circuit shown in FIG. 3. FIG. 3 is a circuit diagram of the first implementation of the control device of the auxiliary power supply circuit according to the first embodiment of the present invention. In the circuit shown in FIG. 3, the chopper switch 10 consists of two MOS transistors Q3 and Q4.

As shown in FIG. 3, the auxiliary source capacitor 20 is C1, and the disconnecting switch 30 is Q2; the auxiliary source capacitor C1 is connected in series with the disconnecting switch Q2, and is connected in series with two diodes (a ninth diode D9 and a tenth diode D10) respectively to form two series branches; and the series branches are respectively connected in parallel with the two MOS transistors of the chopper switch 10.

The series branches include a first series branch and a second series branch. In the first series branch, the negative electrode of the auxiliary source capacitor C1 is connected to the ground, the positive electrode of the auxiliary source capacitor C1 is connected to an end of the disconnecting switch Q2, and the other end of the disconnecting switch Q2 is connected to the cathode of the ninth diode D9. In the second series branch, the negative electrode of the auxiliary source capacitor C1 is connected to the ground, the positive electrode of the auxiliary source capacitor C1 is connected to an end of the disconnecting switch Q2, and the other end of the disconnecting switch Q2 is connected to the cathode of the tenth diode D10.

The chopper switch 10 includes a third MOS transistor Q3 and a fourth MOS transistor Q4. The source electrode of the third MOS transistor Q3 and the source electrode of the fourth MOS transistor Q4 are connected to the ground; the drain electrode of the third MOS transistor Q3 and the anode of the ninth diode D9 are connected to one input end of the input voltage Vin; the drain electrode of the fourth MOS transistor Q4 and the anode of the tenth diode D10 are connected to an end of the output load; the other end of the output load is connected to the other input end of the input voltage Vin; the gate electrode of the third MOS transistor Q3 and the gate electrode of the fourth MOS transistor Q4 are connected together, and as the control end of the chopper switch 10, are connected to the output end of the control device 40.

As shown in FIG. 3, the control device 40 includes a judging circuit and a disconnecting switch driving circuit.

The judging circuit may include a second resistor R2, a third resistor R3, a fourth resistor R4, a first comparator IC1 and a fifth resistor R5.

An end of the second resistor R2, as an input end of the control device 40, is connected to the positive electrode of the auxiliary source capacitor C1, and an end of the third resistor R3 is connected to the ground.

The other end of the second resistor R2 and the other end of the third resistor R3 are connected to the non-inverted input end of the first comparator IC1, the inverted input end of the first comparator IC1 is connected to a reference voltage Vref, and the fourth resistor R4 is connected between the non-inverted input end and the output end of the first comparator IC1.

The output end of the first comparator IC1 is connected to an end of the fifth resistor R5, and the other end of the fifth resistor R5, as a first output end of the control device 40, is connected to the control end of the chopper switch 10.

All devices of the judging circuit form a hysteresis comparator, and the preset voltage (i.e., the upper limit value and the lower limit value set for the auxiliary source voltage) is obtained according to a reference voltage Vref of the hysteresis comparator.

The set lower limit value is $$V_L = \frac{R2+R3}{R3} \cdot Vref - \frac{R2+R3}{R3+R4} \cdot V_o$$

(Vo is an output high level value of the hysteresis comparator), and the set upper limit value is $$V_H = \frac{R2+R3}{R3} \cdot Vref.$$

The disconnecting switch driving circuit includes a first resistor R1.

An end of the first resistor R1 is connected to the chopper voltage control signal Vg, and as a second output end of the control device 40, is connected to the control end of the disconnecting switch Q2. The other end of the first resistor R1 is connected to a common end of the disconnecting switch Q2, the ninth diode D9 and the tenth diode D10, i.e., a high potential end of the disconnecting switch Q2.

The control end of the chopper switch 10 (i.e., the gate electrode of the third MOS transistor Q3 and the gate electrode of the fourth MOS transistor Q4) and the control end of the disconnecting switch Q2 are connected to the chopper voltage control signal Vg.

The voltage across the auxiliary source capacitor C1 is the auxiliary source voltage Vcc.

As shown in FIG. 3, the chopper voltage control signal Vg may be provided by a chopper control circuit 50. The chopper control circuit 50 is used to control the two-wire dimmer to output a chopper voltage. The two-wire dimmer outputs a zero voltage in a case that the chopper voltage control signal Vg is turning off the chopper switch 10; and the two-wire dimmer outputs a non-zero voltage in a case that the chopper voltage control signal Vg is not turning off the chopper switch 10.

It should be noted that in the embodiment of the present invention, the gate electrode driving current of the third MOS transistor Q3 and the fourth MOS transistor Q4 of the chopper switch 10 is provided by a control signal Va output from the judging circuit of the control device 40 (as shown in FIG. 3). The chopper voltage control signal Vg controls the third MOS transistor Q3, the fourth MOS transistor Q4 and the disconnecting switch Q2 to make them turned off, but does not control the third MOS transistor Q3, the fourth MOS transistor Q4 and the disconnecting switch Q2 to make them turned on.

In a case that the chopper voltage control signal Vg is turning off the chopper switch 10, the chopper voltage control signal Vg is at a low level and has a highest priority, therefore, the third MOS transistor Q3 or the fourth MOS transistor Q4 is controlled to be off, and the disconnecting switch Q2 is off. The charging loop of the auxiliary source capacitor C1 is cut off, the chopper switch 10 is off, and the two-wire dimmer outputs a zero voltage.

In a case that the chopper voltage control signal Vg is not turning off the chopper switch 10, the chopper voltage control signal Vg is not at the low level, which still can not drive the third MOS transistor Q3, the fourth MOS transistor Q4 and the disconnecting switch Q2 to be on, that is, the chopper voltage control signal Vg does not control the chopper switch 10 and the disconnecting switch 30. In a case that the judging circuit detects that the auxiliary source voltage Vcc is lower than the set lower limit value, the output signal Va of the first comparator IC1 is at a low level, which controls the chopper switch 10 to be off. In this case, since the chopper switch 10 is off, the first resistor R1 in the disconnecting switch driving circuit outputs a driving voltage signal to the control end of the disconnecting switch Q2 via the ninth diode D9 or the tenth diode D10, to turn on the disconnecting switch Q2. Therefore, a charging loop for the auxiliary source capacitor C1 is formed.

In a case that the chopper voltage control signal Vg is not turning off the chopper switch 10, the chopper voltage control signal Vg is not at the low level, which still can not drive the third MOS transistor Q3, the fourth MOS transistor Q4 and the disconnecting switch Q2 to be on, that is, the chopper voltage control signal Vg does not control the chopper switch 10 and the disconnecting switch 30. In a case that the judging circuit detects that the auxiliary source voltage Vcc is higher than the set upper limit value, the output signal Va of the first comparator IC1 is at a high level, which controls the chopper switch 10 to be on. In this case, the turn-on voltage drop of the chopper switch 10 is too low to turn on the ninth diode D9 or the tenth diode D10, therefore, the disconnecting switch driving circuit can not provide a driving voltage signal to the disconnecting switch Q2 and the disconnecting switch Q2 is off. In this case, the charging loop for the auxiliary source capacitor C1 can not be formed.

Another implementation of the auxiliary power supply circuit is further provided according to the first embodiment of the present invention. In the second implementation of the auxiliary power supply circuit of the two-wire dimmer according to the first embodiment of the present invention, the control device may includes a judging circuit, a logic circuit and a disconnecting switch driving circuit.

The judging circuit is configured to detect the auxiliary source voltage, compare the auxiliary source voltage with a preset voltage, output a first signal to the logic circuit in a case that the auxiliary source voltage is lower than a set lower limit value, and output a second signal to the logic circuit in a case that the auxiliary source voltage is higher than a set upper limit value.

The logic circuit is configured to receive a chopper voltage control signal and control the disconnecting switch and the chopper switch to be off in a case that the chopper voltage control signal is turning off the chopper switch; receive an output signal of the judging circuit and control the chopper switch to be off in a case that the output signal of the judging circuit is the first signal; control the disconnecting switch to be off in a case that the output signal of the judging circuit is the second signal; and control the chopper switch to be on in a case that the output signal of the judging circuit is the second signal and the chopper voltage control signal is not turning off the chopper switch.

The disconnecting switch driving circuit is configured to control the disconnecting switch to be on in a case that the chopper switch is off, the chopper voltage control signal is not turning off the chopper switch and the output signal of the judging circuit is the first signal.

Figure 4:
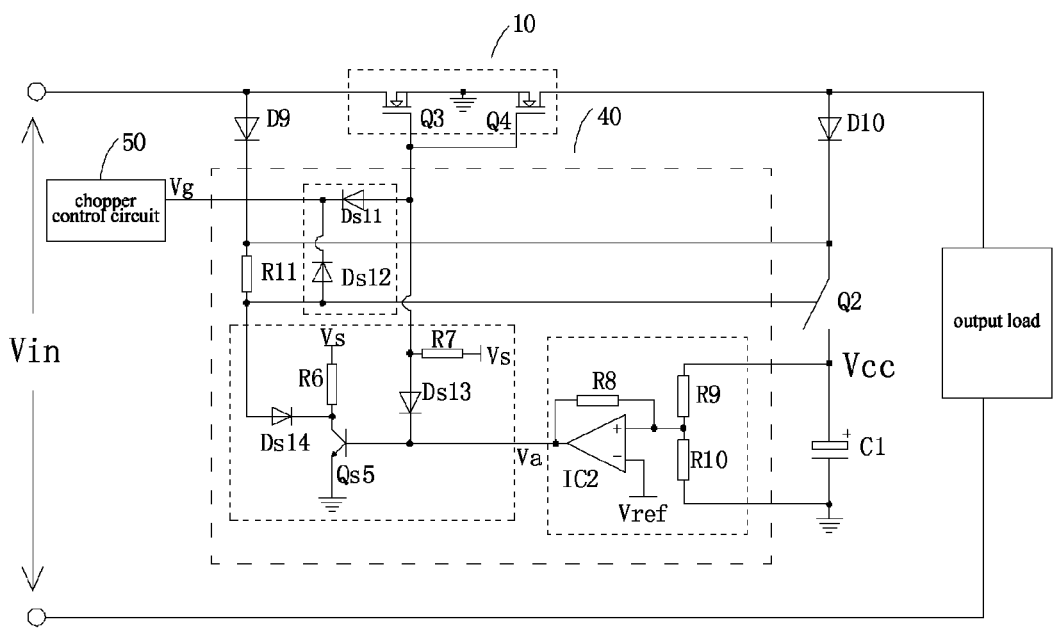
FIG. 4 is a circuit diagram of a second implementation of the control device of the auxiliary power supply circuit according to the first embodiment of the present invention.

The second implementation of the control device of the auxiliary power supply circuit according to the first embodiment of the present invention may be as the circuit shown in FIG. 4. FIG. 4 is a circuit diagram of the second implementation of the control device of the auxiliary power supply circuit according to the first embodiment of the present invention.

In the circuit shown in FIG. 4, the chopper switch 10 consists of two MOS transistors Q3 and Q4. The auxiliary source capacitor 20 is C1, and the disconnecting switch 30 is Q2; the auxiliary source capacitor C1, the disconnecting switch Q2 and two diodes (the ninth diode D9 and the tenth diode D10) connected in parallel form two series branches; the series branches are respectively connected in parallel with the two MOS transistors of the chopper switch 10, and the series branches are the same as the series branch described in FIG. 3.

The connection of the chopper switch 10 and the series branches in the circuit shown in FIG. 4 is the same as that in FIG. 3, and the detailed description thereof is omitted herein. The circuit shown in FIG. 4 differs from the circuit shown in FIG. 3 as follows.

As shown in FIG. 4, the judging circuit may include an eighth resistor R8, a ninth resistor R9, a tenth resistor R10 and a second comparator IC2. The judging circuit forms a hysteresis comparator, as that shown in FIG. 3. The judging circuit outputs a first signal to the logic circuit in a case that the auxiliary source voltage is lower than a set lower limit value, and outputs a second signal to the logic circuit in a case that the auxiliary source voltage is higher than a set upper limit value. In the embodiment shown in FIG. 4, the first signal is a low level signal, and the second signal is a high level signal.

The non-inverted input end of the second comparator IC2 is connected to the positive electrode of the auxiliary source capacitor C1 via the ninth resistor R9, the non-inverted input end of the second comparator IC2 is connected to the negative electrode of the auxiliary source capacitor C1 via the tenth resistor R10, the eighth resistor R8 is connected between the non-inverted input end and the output end of the second comparator IC2, and the inverted input end of the second comparator IC2 is connected to the reference voltage Vref.

The logic circuit includes a thirteenth diode Ds13, a fourteenth diode Ds14, a fifth transistor Qs5, a sixth resistor R6, a seventh resistor R7, an eleventh diode Ds11, a second diode Ds12 and a second auxiliary power supply Vs.

The output end of the second comparator IC2 is connected to the cathode of the thirteenth diode Ds13, and the anode of the thirteenth diode Ds13, as a first output end of the control device 40, is connected to the control end of the chopper switch 10.

The cathode of the fourteenth diode Ds14 is connected to an end of the sixth resistor R6 and the collector of the fifth transistor Qs5; the other end of the sixth resistor R6 is connected to the positive electrode of the second auxiliary power supply Vs; the emitter of the fifth transistor Qs5 is connected to the ground, and the base of the fifth transistor Qs5 is connected to the output end of the second comparator IC2.

An end of the seventh resistor R7 is connected to the anode of the thirteenth diode Ds13 which is the control end of the chopper switch 10, and the other end of the seventh resistor R7 is connected to the positive electrode of the second auxiliary power supply Vs.

The first output end of the control device which is the anode of the thirteenth diode Ds13 is connected to the chopper voltage control signal Vg via the eleventh diode Ds11, and the control end of the disconnecting switch 30 is connected to the chopper voltage control signal Vg via the twelfth diode Ds12.

The disconnecting switch driving circuit includes an eleventh resistor R11.

A common end of the eleventh resistor R11 and the anode of the fourteenth diode Ds14, as a second output end of the control device 40, is connected to the control end of the disconnecting switch Q2.

The other end of the eleventh resistor R11 is connected to a high potential end of the disconnecting switch Q2 which is a common end of the disconnecting switch Q2, the ninth diode D9 and the tenth diode D10.

The control end of the chopper switch 10 is connected to the chopper voltage control signal Vg via the eleventh diode Ds11, and the control end of the disconnecting switch Q2 is connected to the chopper voltage control signal Vg via the twelfth diode Ds12. Specifically, the control end of the chopper switch 10 (i.e., the gate electrode of the third MOS transistor Q3 and the gate electrode of the fourth MOS transistor Q4) is connected to the anode of the eleventh diode Ds11, and the cathode of the eleventh diode Ds11 is connected to the chopper voltage control signal Vg; the control end of the disconnecting switch Q2 is connected to the anode of the twelfth diode Ds12, and the cathode of the twelfth diode Ds12 is connected to the chopper voltage control signal Vg.

The voltage across the auxiliary source capacitor C1 is the auxiliary source voltage Vcc.

The chopper voltage control signal Vg in the second implementation shown in FIG. 4 is the same as that shown in FIG. 3, and the detailed description thereof is omitted herein.

The judging circuit detects the auxiliary source voltage, and in a case that the auxiliary source voltage Vcc is higher than a set upper limit value, the second comparator IC2 outputs Va which is at a high level (that is, a second signal), and the thirteenth diode Ds13 in the logic circuit is turned off, therefore, the judging circuit does not control the chopper switch 10. By inverting of the fifth transistor Qs5 in the logic circuit, the fourteenth diode Ds14 is turned on, and the control end of the disconnecting switch Q2 is at a low level, therefore, the judging circuit controls the disconnecting switch Q2 to be off, and the auxiliary source capacitor C1 is not charged.

Based on the above, in a case that the chopper voltage control signal Vg is not turning off the chopper switch, the eleventh diode Ds11 is turned off, therefore, the chopper voltage control signal Vg does not control the chopper switch 10, the gate electrodes of the third MOS transistor Q3 and the fourth MOS transistor Q4 of the chopper switch 10 are at a high level by the seventh resistor R7 and the second auxiliary power supply Vs in the logic circuit, which provide the gate electrode driving current to the third MOS transistor Q3 and the fourth MOS transistor Q4 to make them turned on, and the output voltage V0 of the two-wire dimmer is an alternating current input voltage Vin which is a non-zero voltage; and in a case that the chopper voltage control signal Vg is turning off the chopper switch, the eleventh diode Ds11 is turned on, the gate electrodes of the third MOS transistor Q3 and the fourth MOS transistor Q4 are at a low level and the third MOS transistor Q3 and the fourth MOS transistor Q4 are turned off since the priority of the chopper voltage control signal Vg is higher than the priority of other signals, therefore, the output voltage of the two-wire dimmer is a zero voltage. In addition, the disconnecting switch Q2 is off, and the auxiliary source capacitor C1 is not charged.

The judging circuit detects the auxiliary source voltage, and in a case that the auxiliary source voltage Vcc is lower than a set lower limit value, the second comparator IC2 outputs Va which is at a low level (that is, a first signal), and the fourteenth diode Ds14 in the logic circuit is turned off, therefore, the judging circuit does not control the disconnecting switch Q2. The thirteenth diode Ds13 in the logic circuit is turned on, and the third MOS transistor Q3 and the fourth MOS transistor Q4 of the chopper switch 10 are off.

Based on the above, in a case that the chopper voltage control signal Vg is turning off the chopper switch, the eleventh diode Ds11 and the twelfth diode Ds12 are turned on, and the chopper switch 10 and the disconnecting switch Q2 are off since the priority of the chopper voltage control signal is higher than the priority of other signals at the control end of the chopper switch 10 and the disconnecting switch Q2, therefore, the charging loop for the auxiliary source capacitor C1 is not formed, and the two-wire dimmer outputs a zero voltage; and in a case that the chopper voltage control signal Vg is not turning off the chopper switch, the eleventh diode Ds11 and the twelfth diode Ds12 are turned off, therefore, the chopper voltage control signal Vg controls neither the chopper switch 10 nor the disconnecting switch Q2. In this case, by the ninth diode D9 or the tenth diode D10, the eleventh resistor R11 in the disconnecting switch driving circuit provides the driving voltage signal to the disconnecting switch Q2, such that the control end of the disconnecting switch Q2 is at a high level, the disconnecting switch Q2 is turned on, a charging loop for the auxiliary source capacitor C1 is formed, and the voltage across the chopper switch 10 charges the auxiliary source capacitor by the disconnecting switch Q2. If the alternating current input voltage Vin is a power network voltage (for example, 110 Vac, 220 Vac or 277 Vac), the alternating current input voltage Vin is far greater than the voltage across the chopper switch 10 since the auxiliary source voltage Vcc is generally controlled to be a voltage which ranges from 0 to 20 volts. Therefore, the output voltage of the two-wire dimmer is the difference between the voltage across the chopper switch 10 and the alternating current input voltage Vin, and thus is a non-zero voltage.

The embodiment described above only provides two implementations of the control device of the auxiliary power supply circuit of the two-wire dimmer according to the first embodiment of the present invention. In practical application, the control device of the auxiliary power supply circuit described in the first embodiment of the present invention may be but not limited to the two implementations described above.

Figure 5:
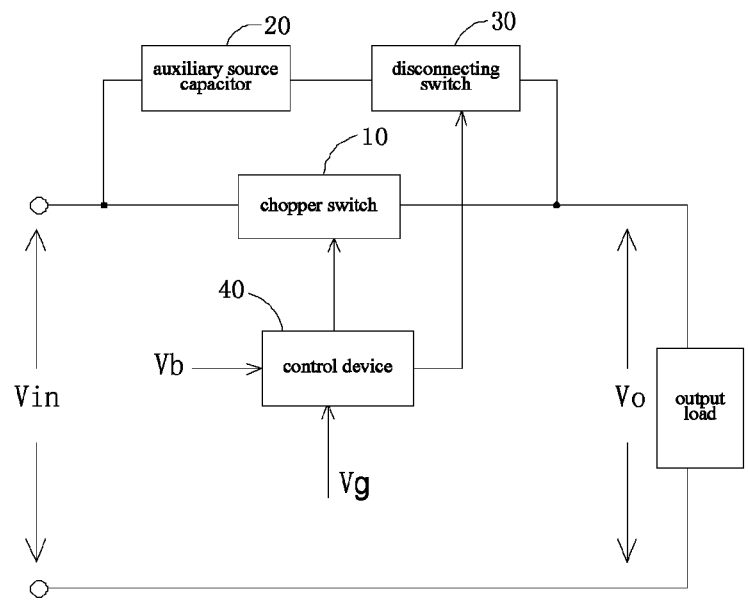
FIG. 5 is a structural diagram of an auxiliary power supply circuit of a two-wire dimmer according to a second embodiment of the present invention.

FIG. 5 is a structural diagram of an auxiliary power supply circuit of a two-wire dimmer according to a second embodiment of the present invention. The circuit of the second embodiment shown in FIG. 5 differs from the circuit of the first embodiment in that: the control device 40 detects the auxiliary source voltage and receives a chopper period control signal Vb and a chopper voltage control signal Vg, judges whether the chopper switch 10 is in a chopper period according to the chopper period control signal Vb, and outputs a signal to control the chopper switch 10 and the disconnecting switch 30 to be on or off according to a comparison result of the auxiliary source voltage with a preset voltage, a state of the chopper voltage control signal Vg and whether the chopper switch 10 being in the chopper period, to control the charging of the auxiliary source capacitor 20.

Specifically, in a case that the auxiliary source voltage is lower than a set lower limit value and the chopper switch 10 is in a non-chopper period, the chopper switch 10 is controlled to be off and the disconnecting switch 30 is controlled to be on, to charge the auxiliary source capacitor 20; in a case that the auxiliary source voltage is not lower than the set lower limit value, or in a case that the auxiliary source voltage is lower than the set lower limit value and the chopper switch 10 is in a chopper period, the chopper switch 10 and the disconnecting switch 30 are controlled according to the chopper voltage control signal Vg, such that the two-wire dimmer outputs a corresponding voltage.

The chopper period control signal Vb may be output from a chopper control circuit (not shown in the figures). The chopper period control signal Vb has two states: the chopper period control signal Vb is in a first state in a case that the chopper switch 10 is in a chopper period; and the chopper period control signal Vb is in a second state in a case that the chopper switch 10 is in a non-chopper period. The control device 40 may judge whether the chopper switch 10 is in a chopper period or a non-chopper period according to the state of the chopper period control signal Vb. The control device 40 controls the auxiliary source capacitor to be charged in the non-chopper period according to the chopper period control signal Vb in a case that the auxiliary source voltage is lower than a set lower limit value.

An implementation of the auxiliary power supply circuit is provided according to the second embodiment of the present invention. In the auxiliary power supply circuit of the two-wire dimmer according to the second embodiment of the present invention, the control device includes a first judging circuit, a second judging circuit, a logic circuit and a disconnecting switch driving circuit.

The first judging circuit is configured to detect the auxiliary source voltage, compare the auxiliary source voltage with a preset voltage, output a first signal to the logic circuit in a case that the auxiliary source voltage is lower than a set lower limit value, and output a second signal to the logic circuit in a case that the auxiliary source voltage is higher than a set upper limit value.

The second judging circuit is configured to detect the chopper period control signal, judge whether the chopper switch is in a chopper period according to the chopper period control signal, output a third signal to the logic circuit in a case that the chopper switch is in a chopper period, and output a fourth signal to the logic circuit in a case that the chopper switch is in a non-chopper period.

The logic circuit is configured to receive an output signal of the first judging circuit, an output signal of the second judging circuit and a chopper voltage control signal, control the chopper switch to be on in a case that the first judging circuit outputs the second signal and the chopper switch control signal is not turning off the chopper switch or in a case that the second judging circuit outputs the third signal and the chopper switch control signal is not turning off the chopper switch; control the chopper switch to be off in a case that the first judging circuit outputs the first signal and the second judging circuit outputs the fourth signal or in a case that the chopper switch control signal is turning off the chopper switch; and control the disconnecting switch to be off in a case that the chopper switch control signal is turning off the chopper switch.

The disconnecting switch driving circuit controls the disconnecting switch to be on in a case that the chopper switch is off and the chopper voltage control signal is not turning off the chopper switch.

Figure 6:
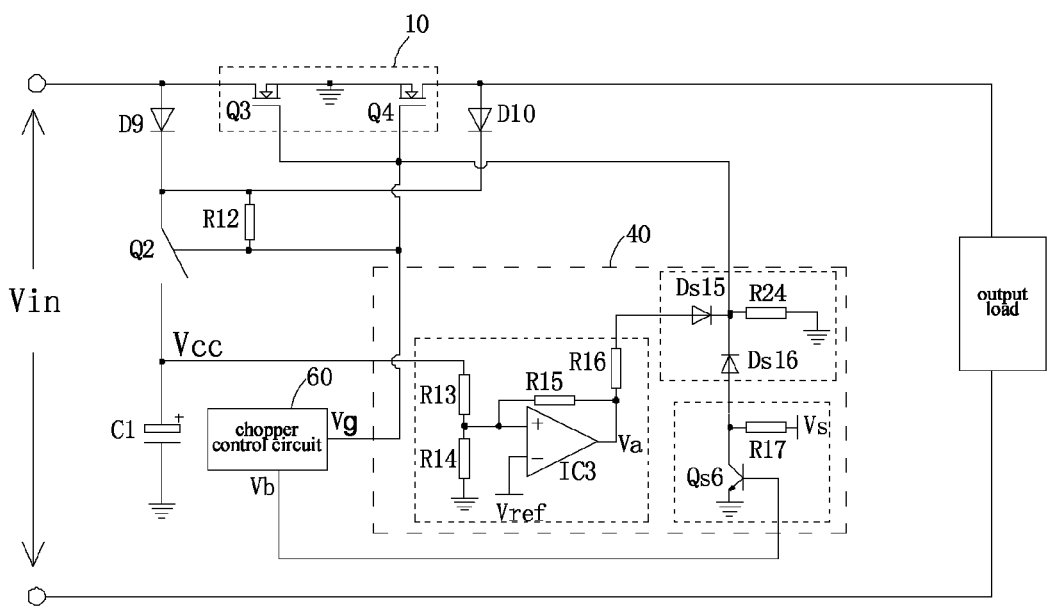
FIG. 6 is a circuit diagram of an implementation of a control device of the auxiliary power supply circuit according to the second embodiment of the present invention.

Specifically, the implementation of the control device of the auxiliary power supply circuit according to the second embodiment of the present invention may be as the circuit shown in FIG. 6. FIG. 6 is a circuit diagram of an implementation of a control device of the auxiliary power supply circuit according to the second embodiment of the present invention. As shown in FIG. 6, the chopper switch 10 consists of two MOS transistors Q3 and Q4.

As shown in FIG. 6, the auxiliary source capacitor 20 is C1, and the disconnecting switch 30 is Q2; the auxiliary source capacitor C1, the disconnecting switch Q2 and two diodes connected in parallel (the ninth diode D9 and the tenth diode D10) form a series branch; and the series branch is connected in parallel with the chopper switch 10.

Specifically, in the series branch, the negative electrode of the auxiliary source capacitor C1 is connected to the ground, the positive electrode of the auxiliary source capacitor C1 is connected to an end of the disconnecting switch Q2, and the other end of the disconnecting switch Q2 is connected to the cathode of the ninth diode D9 and the cathode of the tenth diode D10.

The chopper switch 10 includes a third MOS transistor Q3 and a fourth MOS transistor Q4. The source electrode of the third MOS transistor Q3 and the source electrode of the fourth MOS transistor Q4 are connected to the ground; the drain electrode of the third MOS transistor Q3 and the anode of the ninth diode D9 are connected to an input end of the input voltage Vin; the drain electrode of the fourth MOS transistor Q4 and the anode of the tenth diode D10 are connected to an end of the output load, and the other end of the load is connected to the other input end of the input voltage Vin; and the gate electrode of the third MOS transistor Q3 and the gate electrode of the fourth MOS transistor Q4 are connected together, and as the control end of the chopper switch 10, are connected to the output end of the control device 40.

As shown in FIG. 6, the control device 40 includes a first judging circuit, a second judging circuit, a logic circuit and a disconnecting switch driving circuit.

The first judging circuit includes a thirteenth resistor R13, a fourteenth resistor R14, a fifteenth resistor R15, a sixteenth resistor R16 and a third comparator IC3. The first judging circuit forms a hysteresis comparator, as the judging circuit in FIG. 3. In this embodiment, a first signal and a second signal, being signals output from the first judging circuit, are a low level signal and a high level signal respectively.

An end of the thirteenth resistor R13, as an input end of the control device 40, is connected to the positive electrode of the auxiliary source capacitor C1, and an end of the fourteenth resistor R14 is connected to the ground.

The other end of the thirteenth resistor R13 and the other end of the fourteenth resistor R14 are connected to the non-inverted input end of the third comparator IC3; the inverted input end of the third comparator IC3 is connected to a reference voltage Vref, and the fifteenth resistor R15 is connected between the non-inverted input end and the output end of the third comparator IC3.

The output end of the third comparator IC3 is connected to an end of the sixteenth resistor R16, and the other end of the sixteenth resistor R16 is connected to the anode of the fifteenth diode Ds15.

The second judging circuit includes a sixth transistor Qs6, a seventeenth resistor R17 and a second auxiliary power supply Vs. In this embodiment, a third signal and a fourth signal, being signals output from the second judging circuit, are a high level signal and a low level signal respectively.

The base of the sixth transistor Qs6 is connected to the chopper period control signal Vb output from the chopper control circuit 60, the emitter of the sixth transistor Qs6 is connected to the ground, the collector of the sixth transistor Qs6 is connected to an end of the seventeenth resistor R17 and the anode of the sixteenth diode Ds16, and the other end of the seventeenth resistor R17 is connected to the positive electrode of the second auxiliary power supply Vs.

The logic circuit includes a twenty-fourth resistor R24, a fifteenth diode Ds15 and a sixteenth diode Ds16.

The cathode of the sixteenth diode Ds16 and the cathode of the fifteenth diode Ds15 are connected together, and as a first output end of the control device 40, are connected to the control end of the chopper switch 10 and an end of the twenty-fourth resistor R24, and the other end of the twenty-fourth resistor R24 is connected to the ground.

The disconnecting switch driving circuit includes a twelfth resistor R12.

An end of the twelfth resistor R12 is connected to the chopper voltage control signal Vg and as the second output end of the control device 40, is connected to the control end of the disconnecting switch Q2.

The other end of the twelfth resistor R12 is connected to a high potential end of the disconnecting switch Q2 which is a common end of the disconnecting switch Q2, the ninth diode D9 and the tenth diode D10.

The control end of the chopper switch 10 (i.e., the gate electrode of the third MOS transistor Q3 and the gate electrode of the fourth MOS transistor Q4) and the control end of the disconnecting switch Q2 are connected to the chopper voltage control signal Vg output from the chopper control circuit 60.

The voltage across the auxiliary source capacitor C1 is the auxiliary source voltage Vcc.

In the circuit shown in FIG. 6, the chopper period control signal Vb has two states: a high level state and a low level state.

The auxiliary source capacitor 10 is only charged in a non-chopper period. That is, in a chopper period, the control device 40 controls the disconnecting switch 30 and the chopper switch 10 such that the auxiliary source capacitor 10 is not charged, no matter whether the auxiliary source voltage Vcc is lower than a low limit value.

The second judging circuit detects the chopper period control signal Vb. In a case that the chopper switch 10 is in a chopper period, the chopper period control signal Vb is at a low level, the second judging circuit outputs a high level (that is, the third signal) to the logic circuit by inverting of the sixth transistor Qs6, the sixteenth diode Ds16 in the logic circuit is turned on, and the second judging circuit controls the gate electrodes of the third MOS transistor Q3 and the fourth MOS transistor Q4 of the chopper switch 10 to be high level. Then, in a case that the gate electrode of the chopper switch 10 is at a high level under the control of a signal output from the second judging circuit via the logic circuit and the chopper voltage control signal Vg is not turning off the chopper switch, the third MOS transistor Q3 and the fourth MOS transistor Q4 are turned on, but the turn-on voltage drops are low, such that the ninth diode D9 and the tenth diode D10 are turned off, the disconnecting switch driving circuit can not provide the driving voltage signal to the disconnecting switch Q2, therefore, the disconnecting switch Q2 is off, and the auxiliary source capacitor C1 is not charged.

In a case that the gate of the chopper switch 10 is at a high level under the control of a signal output from the second judging circuit via the logic circuit and the chopper voltage control signal Vg is turning off the chopper switch, the third MOS transistor Q3 and the fourth MOS transistor Q4 are turned off, and the ninth diode D9 and the tenth diode D10 are turned on. However, since the chopper voltage control signal Vg is turning off the chopper switch and has a priority higher than other signals, the control end of the disconnecting switch Q2 is at a low level under the control of the chopper voltage control signal Vg, therefore, the disconnecting switch Q2 is turned off, and the auxiliary source capacitor C1 is not charged.

The second judging circuit detects the chopper period control signal Vb, the two-wire dimmer does not output the zero voltage in a case that the chopper switch 10 is in a non-chopper period, therefore, the chopper voltage control signal Vg is not turning off the chopper switch, that is, the chopper voltage control signal Vg controls neither the chopper switch nor the disconnecting switch; and since the chopper switch 10 is in a non-chopper period, the chopper period control signal Vb is at the high level rather than the low level, the second judging circuit outputs a low level signal (i.e., the fourth signal) to the logic circuit by the inverting of the sixth transistor Qs6 of the second judging circuit, the sixteenth diode Ds16 in the logic circuit is turned off, therefore, the second judging circuit does not control the chopper switch 10 by the logic circuit.

Based on the above, the first judging circuit detects the auxiliary source voltage Vcc. In a case that the auxiliary source voltage Vcc is higher than a set upper limit value, Va output from the third comparator IC3 is at a high level (i.e., the second signal), the fifteenth diode Ds15 in the logic circuit is turned on, the gate electrodes of the third MOS transistor Q3 and the fourth MOS transistor Q4 of the chopper switch 10 are at high level, and the third MOS transistor Q3 and the fourth MOS transistor Q4 are turned on, but the turn-on voltage drops are low, such that the ninth diode D9 and the tenth diode D10 are turned off, therefore, the disconnecting switch driving circuit can not provide the driving voltage to the disconnecting switch Q2, and the auxiliary source capacitor C1 is not charged; and in a case that the auxiliary source voltage Vcc is lower than a set lower limit value, Va output from the third comparator IC3 is at a low level (i.e., the first signal), the fifteenth diode Ds15 in the logic circuit is turned off, that is, the first judging circuit does not control the chopper switch 10. Since all of the first judging circuit, the second judging circuit and the chopper voltage control signal Vg do not control the chopper switch 10, the gate electrodes of the third MOS transistor Q3 and the fourth MOS transistor Q4 of the chopper switch 10 are at low levels under the action of the twenty-fourth resistor R24 in the logic circuit, and the third MOS transistor Q3 and the fourth MOS transistor Q4 are turned off, but the ninth diode D9 and the tenth diode D10 are turned on due to the voltage drops, such that the disconnecting switch driving circuit provides a driving voltage to the disconnecting switch Q2 via the twelfth resistor R12, the control end of the disconnecting switch Q2 is at a high level, the disconnecting switch Q2 is turned on, and the auxiliary source capacitor C1 is charged.

The embodiment described above only provides one implementation of the control device of the auxiliary power supply circuit of the two-wire dimmer according to the second embodiment of the present invention. In practical application, the control device of the auxiliary power supply circuit described in the second embodiment of the present invention may be but not limited to the implementation described above.

In the implementations of the control device of the auxiliary power supply circuit of the two-wire dimmer according to the two embodiments described above, the chopper switch 10 consists of two MOS transistors. In practical application, the chopper switch 10 may be implemented in many ways. Several implementations of the chopper switch are described in detail below.

Figure 7:
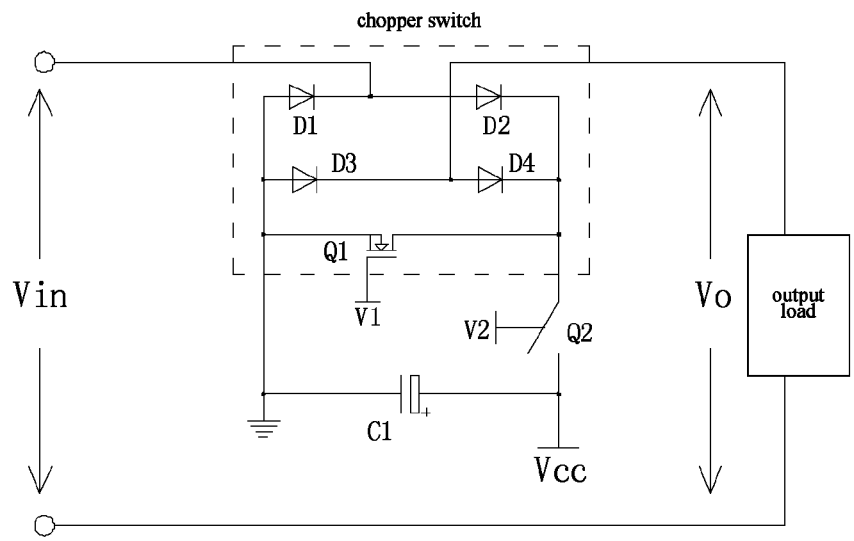
FIG. 7 is a circuit diagram of a first implementation of a chopper switch according to an embodiment of the present invention.

FIG. 7 is a circuit diagram of a first implementation of the chopper switch according to an embodiment of the present invention. As shown in FIG. 7, the chopper switch 10 consists of a rectifier bridge and a unidirectional switch.

As shown in FIG. 7, the auxiliary source capacitor 20 is C1, and the disconnecting switch 30 is Q2; the auxiliary source capacitor C1 and the disconnecting switch Q2 are connected in series to form a series branch; and the series branch is connected in parallel with the output end of the rectifier bridge of the chopper switch 10, an input end of the rectifier bridge of the chopper switch 10 is connected between an end of the input voltage Vin and an end of the output load, and the other end of the output load is connected to the other end of the input voltage Vin.

In the series branch, the negative electrode of the auxiliary source capacitor C1 is connected to the ground, and the positive electrode of the auxiliary source capacitor C1 is connected to an end of the disconnecting switch Q2.

Specifically, an end of the series branch which is the other end of the disconnecting switch Q2 is connected to a positive output end of the rectifier bridge of the chopper switch 10; and the other end of the series branch which is the negative electrode of the auxiliary source capacitor C1 is connected to a negative output end of the rectifier bridge of the chopper switch 10.

The chopper switch 10 is a bi-direction switch consisting of a switch transistor Q1 and a rectifier bridge, in which the rectifier bridge consists of a first diode D1, a second diode D2, a third diode D3 and a fourth diode D4.

The source electrode of the switch transistor Q1 is connected to a common end of the series branch and the ground, and the drain electrode of the switch transistor Q1 is connected to the other end of the series branch.

The first diode D1 is connected in series with the second diode D2, and the cathode of the first diode D1 is connected to the anode of the second diode D2.

The third diode D3 is connected in series with the fourth diode D4, and the cathode of the third diode D3 is connected to the anode of the fourth diode D4.

The anode of the first diode D1 and the anode of the third diode D3 are connected to the source electrode of the switch transistor Q1; and the cathode of the second diode D2 and the cathode of the fourth diode D4 are connected to the drain electrode of the switch transistor Q1.

A common end of the first diode D1 and the second diode D2, as an end of the two-wire dimmer, is connected to the end of the input voltage Vin; a common end of the third diode D3 and the fourth diode D4, as the other end of the two-wire dimmer, is connected to the end of the output load, and the voltage output from the two-wire dimmer is Vo; the two-wire dimmer and the output load are connected in series and then connected in parallel with the alternating current input voltage Vin.

The gate electrode of the switch transistor Q1 is connected to a first signal V1; and the control end of the disconnecting switch Q2 is connected to a second signal V2.

The voltage across the auxiliary source capacitor C1 is the auxiliary source voltage Vcc.

It should be noted that the switch transistor Q1 which forms the chopper switch 10 in FIG. 7 is only illustrated as a MOS transistor. In practical application, any unidirectional switch transistor may be used as the switch transistor Q1 shown in the figures to form the chopper switch in the embodiment of the present invention.

In the circuit shown in FIG. 7, in a case that the switch transistor Q1 is controlled to be off and the disconnecting switch Q2 is controlled to be on, the two-wire dimmer obtains the auxiliary source voltage, the output voltage of the two-wire dimmer, which is a voltage V0 between two ends of the load, is a difference between the input voltage Vin and the auxiliary source voltage Vcc; in a case that the switch transistor Q1 is controlled to be on and the disconnecting switch Q2 is controlled to be off, the auxiliary source capacitor C1 is discharged to an auxiliary source load (not shown in the figures), the output voltage V0 of the two-wire dimmer is equal to the input voltage Vin; and in a case that the switch transistor Q1 is controlled to be off and the disconnecting switch Q2 is controlled to be off, the auxiliary source capacitor C1 is discharged, and the output voltage V0 of the dimmer is zero.

In the auxiliary power supply circuit shown in FIG. 7, if the two-wire dimmer outputs a zero voltage and a non-zero voltage alternately in half period of the alternating current voltage Vin, the output voltage of the two-wire dimmer is a chopper voltage. Specifically, in a case that the chopper voltage control signal Vg of the circuit shown in FIG. 7 is a control signal of a trailing edge dimmer, the waveform of the output voltage V0 is shown in FIG. 8.

Figure 8:
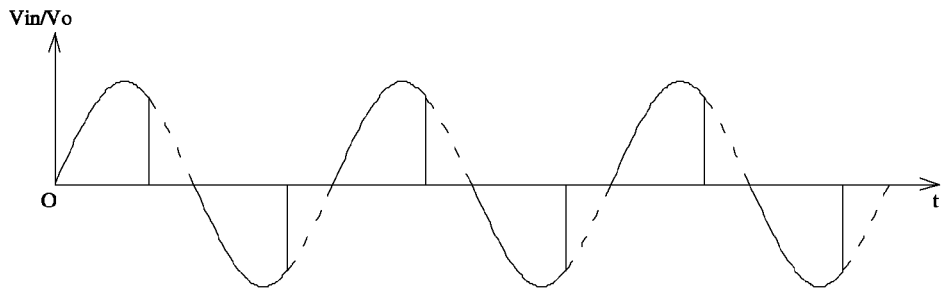
FIG. 8 is a diagram of a waveform of an output voltage of the circuit shown in FIG. 7.

In FIG. 8, the dotted lines indicate the input voltage Vin of the two-wire dimmer which is a sinusoidal alternating current; and the solid lines indicate the output voltage V0 of the two-wire dimmer which is the chopper voltage when the auxiliary source capacitor is not charged.

Figure 9:
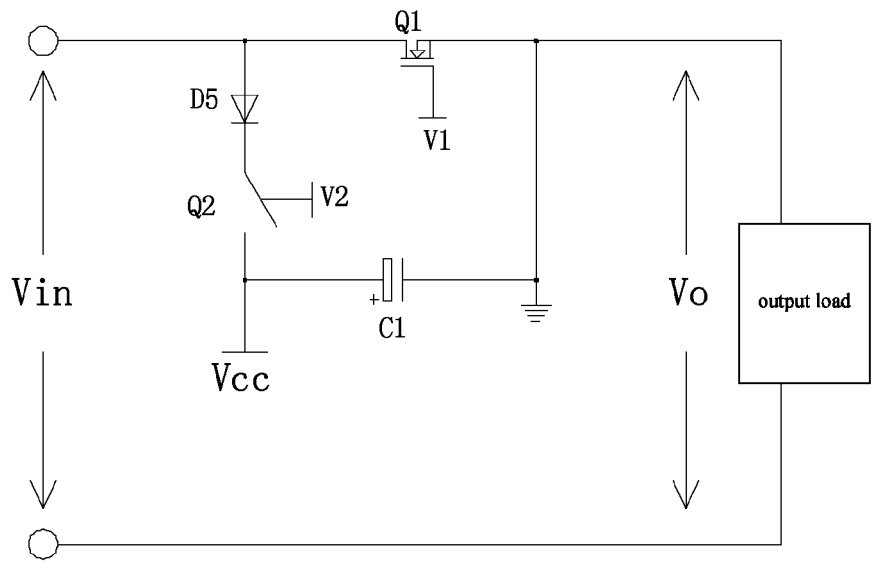
FIG. 9 is a circuit diagram of a second implementation of the chopper switch according to an embodiment of the present invention.

FIG. 9 is a circuit diagram of a second implementation of the chopper switch according to an embodiment of the present invention. In the circuit shown in FIG. 9, the chopper switch 10 consists of a unidirectional switch. Compared with the circuit shown in FIG. 7, the circuit shown in FIG. 9 further includes a rectifier device D5 connected in series with the auxiliary source capacitor C1 and the disconnecting switch Q2.

As shown in FIG. 9, the auxiliary source capacitor 20 is C1, and the disconnecting switch 30 is Q2; the auxiliary source capacitor C1, the disconnecting switch Q2 and the rectifier device D5 are connected in series to form a series branch; the series branch and the chopper switch 10 are connected in parallel and are connected between the input voltage Vin and the output load.

In the series branch, the negative electrode of the auxiliary source capacitor C1 is connected to an end of the output load, and the positive electrode of the auxiliary source capacitor C1 is connected to an end of the disconnecting switch Q2; the other end of the disconnecting switch Q2 is connected to the cathode of the rectifier device D5, and the anode of the rectifier device D5 is connected to an end of the input voltage Vin.

The chopper switch 10 includes a MOS transistor Q1. The source electrode of the MOS transistor Q1 is connected to an end of the output load, and the drain electrode of the MOS transistor Q1 is connected to the series branch and an end of the input voltage Vin. The two-wire dimmer and the load are connected in series and then connected in parallel with the input voltage Vin.

The gate electrode of the MOS transistor Q1 is connected to a first signal V1; and the control end of the disconnecting switch Q2 is connected to a second signal V2.

The voltage across the auxiliary source capacitor C1 is the auxiliary source voltage Vcc.

Figure 10:
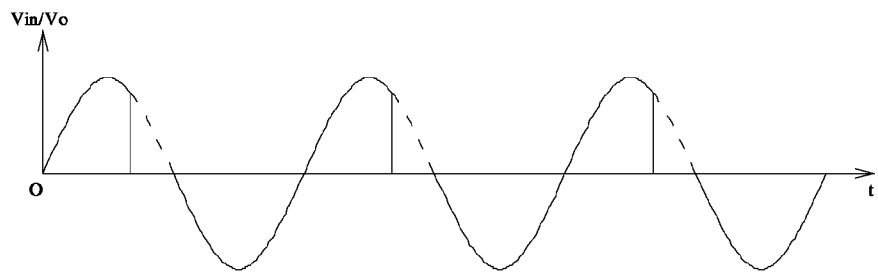
FIG. 10 is a diagram of a waveform of an output voltage of the circuit shown in FIG. 9.

The operating principle of the circuit shown in FIG. 9 is similar to that in FIG. 7, and the description thereof is omitted. The circuit shown in FIG. 9 differs from the circuit shown in FIG. 7 in that: a chopper voltage is output in one half period and the body diode of the MOS transistor Q1 is turned on in the other half period in a case that the two-wire dimmer outputs a chopper voltage. That is, the two-wire dimmer outputs a chopper voltage in one half period and outputs an alternating current input voltage in the other half period during an alternating current period. Specifically, in a case that the chopper voltage control signal Vg of the circuit shown in FIG. 9 is a control signal of a trailing edge dimmer, the waveform of the output voltage is shown as FIG. 10.

It should be noted that the MOS transistor is taken as an example to form the chopper switch 10 in FIG. 9. In practical application, the switch transistor Q1 shown in FIG. 9 may be replaced by inversely connecting a unidirectional switch transistor with a diode in parallel, to form the chopper switch in the embodiment of the present invention. For example, the chopper switch 10 may be as shown in FIG. 11.

Figure 11:
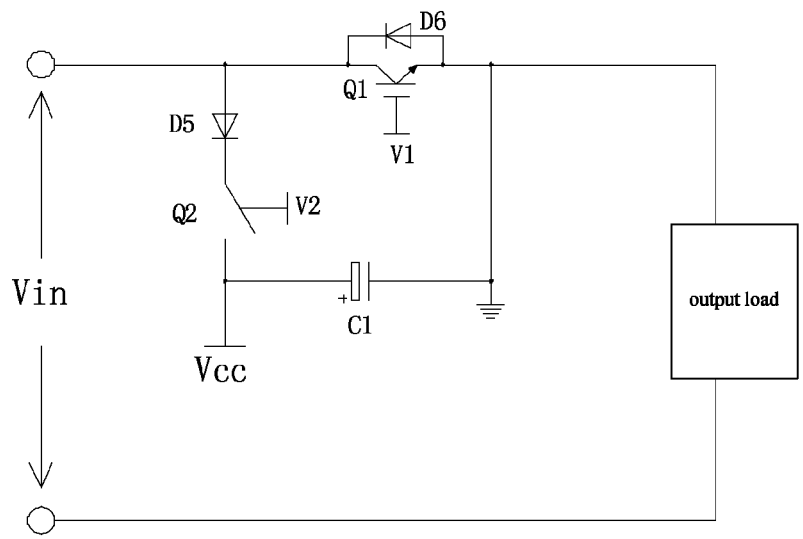
FIG. 11 is a circuit diagram of a third implementation of the chopper switch according to an embodiment of the present invention.

FIG. 11 is a circuit diagram of a third implementation of the chopper switch according to an embodiment of the present invention. In the circuit shown in FIG. 11, the chopper switch 10 includes a unidirectional switch. Compared with the circuit shown in FIG. 9, a switch transistor Q1 is inversely connected in parallel with a diode D6 in the circuit shown in FIG. 11 to replace the MOS transistor Q1 in FIG. 9.

As shown in FIG. 11, the auxiliary source capacitor 20 is C1, and the disconnecting switch 30 is Q2; the auxiliary source capacitor C1, the disconnecting switch Q2 and the rectifier device D5 are connected in series to form a series branch; the series branch and the chopper switch 10 are connected in parallel between the input voltage Vin and the output load.

In the series branch, the negative electrode of the auxiliary source capacitor C1 is connected to an end of the output load, and the positive electrode of the auxiliary source capacitor C1 is connected to an end of the disconnecting switch Q2; the other end of the disconnecting switch Q2 is connected to the cathode of the rectifier device D5, and the anode of the rectifier device D5 is connected to an end of the input voltage Vin.

The chopper switch 10 includes a switch transistor Q1 and a sixth diode D6, the emitter of the switch transistor Q1 is connected to an end of the output load, and the collector of the switch transistor Q1 is connected to the series branch and an end of the input voltage Vin.

The cathode of the sixth diode D6 is connected to the collector of the switch transistor Q1, and the anode of the sixth diode D6 is connected to the emitter of the switch transistor Q1.

The gate electrode of the switch transistor Q1 is connected to the first control signal V1; and the control end of the disconnecting switch Q2 is connected to the second control signal V2.

The voltage across the auxiliary source capacitor C1 is the auxiliary source voltage Vcc.

The operating principle of the circuit shown in FIG. 11 is similar as that in FIG. 9, and the detailed description thereof is omitted.

Figure 12:
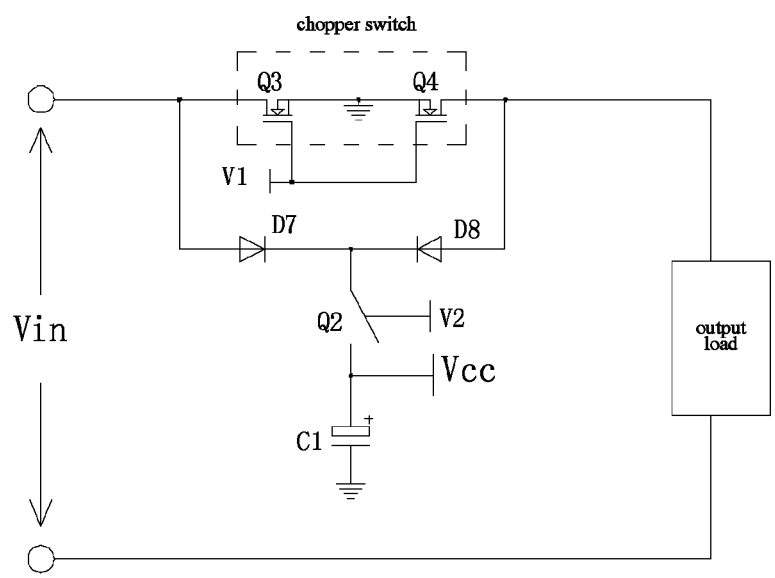
FIG. 12 is a circuit diagram of a fourth implementation of the chopper switch according to an embodiment of the present invention.

FIG. 12 is a circuit diagram of a fourth implementation of the chopper switch according to an embodiment of the present invention. In the circuit shown in FIG. 12, the chopper switch 10 consists of two MOS transistors. The chopper switches according to the embodiments described above in FIG. 3, FIG. 4 and FIG. 6 are described by taking the chopper switch in this embodiment as an example.

As shown in FIG. 12, the auxiliary source capacitor 20 is C1, and the disconnecting switch 30 is Q2; the auxiliary source capacitor C1 and the disconnecting switch Q2 are connected in series with two diodes to form two series branches; and the series branches are connected in parallel with the switch transistors in the chopper switch 10 respectively.

In the first series branch, the negative electrode of the auxiliary source capacitor C1 is connected to the ground, the positive electrode of the auxiliary source capacitor C1 is connected to an end of the disconnecting switch Q2, and the other end of the disconnecting switch Q2 is connected to the cathode of a seventh diode D7.

In the second series branch, the negative electrode of the auxiliary source capacitor C1 is connected to the ground, the positive electrode of the auxiliary source capacitor C1 is connected to an end of the disconnecting switch Q2, and the other end of the disconnecting switch Q2 is connected to the cathode of an eighth diode D8.

The chopper switch 10 includes a third MOS transistor Q3 and a fourth MOS transistor Q4. The source electrode of the third MOS transistor Q3 and the source electrode of the fourth MOS transistor Q4 are connected to the ground.

The first series branch is connected in parallel with the third MOS transistor Q3 of the chopper switch 10, and the second series branch is connected in parallel with the fourth MOS transistor Q4 of the chopper switch 10.

Specifically, an end of the first series branch (i.e., the anode of the seventh diode D7) is connected to the drain electrode of the third MOS transistor Q3, and the other end of the first series branch (i.e., the negative electrode of the auxiliary source capacitor C1) is connected to the source electrode of the third MOS transistor Q3; an end of the second series branch (i.e., the anode of the eighth diode D8) is connected to the drain electrode of the fourth MOS transistor Q4, and the other end of the second series branch (i.e., the negative electrode of the auxiliary source capacitor C1) is connected to the source electrode of the fourth MOS transistor Q4.

The drain electrode of the third MOS transistor Q3 is connected to an end of the input voltage Vin, the drain electrode of the fourth MOS transistor Q4 is connected to an end of the output load, and the other end of the output load is connected to the other end of the input voltage Vin.

The gate electrode of the third MOS transistor Q3 and the gate electrode of the fourth MOS transistor Q4 are connected to a first control signal V1; and the control end of the disconnecting switch Q2 is connected to a second control signal V2.

The voltage across the auxiliary source capacitor C1 is the auxiliary source voltage Vcc.

The operating principle of the circuit shown in FIG. 12 is similar to that in FIG. 7, and the detailed description thereof is omitted.

All of the implementations of the control device described in the first embodiment and the second embodiment of the present invention may be applied to the circuits of the four chopper switches provided in FIG. 7 to FIG. 12.

In the embodiments shown in FIG. 7 to FIG. 12, the disconnecting switch Q2 may be any unidirectional switch transistors. Moreover, in the embodiments shown in FIG. 7 to FIG. 12, the first control signal V1 and the second control signal V2 are connected to the output ends of the control device 40 according to the specific implementation.

Preferably, in the embodiments of the present invention, the chopper switch may be one or more; and each of the chopper switches may be a unidirectional switch or a bidirectional switch.

Preferably, the series branch connected in parallel with the chopper switch may be one or more.

Another auxiliary power supply circuit of a two-wire dimmer is further provided according to an embodiment of the present invention. Compared with the circuit provided in the embodiments described above, the circuit includes a chopper switch, an auxiliary source capacitor, a disconnecting switch and a rectifier device.

The rectifier device and the auxiliary source capacitor are connected in series to form a series branch; the disconnecting switch and the series branch are connected in parallel to form a parallel branch; and then the chopper switch is connected in series with the parallel branch.

In a case that the disconnecting switch is off, the auxiliary source capacitor is connected in series with the chopper switch, and the auxiliary source capacitor is charged via the rectifier device; and in a case that the disconnecting switch is on, the charging of the auxiliary source capacitor is stopped.

Figure 13:
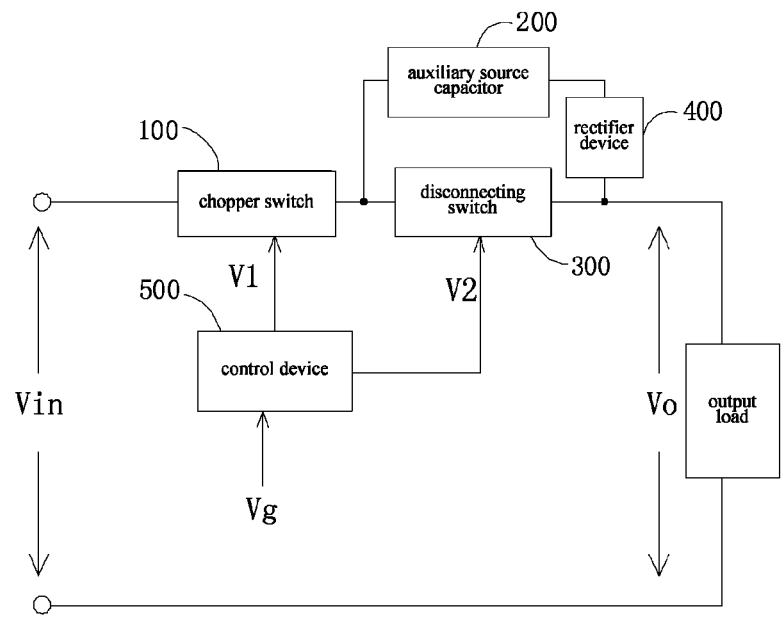
FIG. 13 is a structural diagram of an auxiliary power supply of a two-wire dimmer according to a third embodiment of the present invention.

FIG. 13 is a structural diagram of an auxiliary power supply of a two-wire dimmer according to a third embodiment of the present invention. The auxiliary power supply of the two-wire dimmer may include a chopper switch 100, an auxiliary source capacitor 200, a disconnecting switch 300, a rectifier device 400 and a control device 500.

The rectifier device 400 and the auxiliary source capacitor 200 are connected in series to form a series branch; the disconnecting switch 300 and the series branch are connected in parallel to form a parallel branch; and then the chopper switch 100 is connected in series with the parallel branch.

The two ends of the chopper switch 100 are respectively connected to an end of the input alternating current power supply Vin and an end of the parallel branch, the other end of the parallel branch is connected to an output load end which is not connected to the alternating current power supply Vin, and the other end of the load is connected to the other end of the input alternating current power supply.

In a case that the disconnecting switch 300 is off, the auxiliary source capacitor 200 is connected in series with the chopper switch 100, and the alternating current power supply Vin charges the auxiliary source capacitor 200 via the rectifier device 400 when the chopper switch 100 is on; in a case that the disconnecting switch 300 is on, the charging of the auxiliary source capacitor 200 is stopped.

The control device 500 detects the auxiliary source voltage and receives a chopper voltage control signal Vg, outputs a signal to control the disconnecting switch 300 and the chopper switch 100 to be on or off according to a comparison result of the auxiliary source voltage with a preset voltage and a state of the chopper voltage control signal Vg, and charges the auxiliary source capacitor 200 via the rectifier device 400.

In FIG. 13, in a case that the auxiliary source voltage is lower than a set lower limit value and the chopper voltage control signal Vg is not turning off (i.e., turning on) the chopper switch 100, the control device 500 controls the auxiliary source capacitor 200 to be charged.

Here, the two-wire dimmer outputs a chopper voltage or a non-chopper voltage. In a case that a chopper voltage is output, the chopper voltage is used to transfer an adjusting signal by the two-wire dimmer.

It should be noted that in the embodiment of the present invention, the chopper voltage control signal (for example, Vg shown in FIG. 13) is a signal for controlling the output voltage of the two-wire dimmer. In a case that the chopper voltage control signal Vg is turning off the chopper switch 100, the two-wire dimmer outputs a zero voltage; and in a case that the chopper voltage control signal Vg is not turning off the chopper switch 100, the two-wire dimmer outputs a non-zero voltage.

In a case that the chopper voltage control signal Vg is turning off the chopper switch 100, the control device 500 outputs a first signal V1 to control the chopper switch 100 to be off, and outputs a second signal V2 to control the disconnecting switch 300 to be on, and the two-wire dimmer outputs a zero voltage.

In a case that the chopper voltage control signal Vg is not turning off the chopper switch 100, the control device 500 outputs the first signal V1 to control the chopper switch 100 to be on. In a case that the auxiliary source voltage is lower than a set lower limit value and the auxiliary source capacitor 200 needs to be charged, the control device 500 outputs the second signal V2 to control the disconnecting switch 300 to be off, and the voltage across the disconnecting switch 300 charges the auxiliary source capacitor 200 via the rectifier device 400.

If the alternating current input voltage Vin is a power network voltage (for example, 110 Vac, 220 Vac or 277 Vac), the alternating current input voltage Vin is far greater than the voltage across the chopper switch 100 since the auxiliary source voltage is usually a voltage which ranges from 0 to 20 volts. Therefore, the output voltage of the two-wire dimmer is the difference between the alternating current input voltage Vin and the voltage across the chopper switch 100, and thus is a non-zero voltage.

In a case that the chopper switch control signal Vg is not turning off the chopper switch 100, the control device 500 outputs the first signal V1 to control the chopper switch 100 to be on, and in a case that the auxiliary source voltage is higher than a set upper limit value and the auxiliary source capacitor 200 does not need to be charged, the control device 500 outputs the second signal V2 to control the disconnecting switch 300 to be on, and the output voltage of the two-wire dimmer is the alternating current input voltage Vin, which is a non-zero voltage.

An implementation of the control device of the auxiliary power supply circuit of the two-wire dimmer according to the third embodiment of the present invention is described in detail below.

A specific implementation of the auxiliary power supply circuit is provided according to the third embodiment of the present invention. In the auxiliary power supply circuit of the two-wire dimmer according to the third embodiment of the present invention, the control device may include a first judging circuit, a second judging circuit and a logic circuit.

The first judging circuit is configured to detect the auxiliary source voltage, compare the auxiliary source voltage with a preset voltage, output a first signal to the logic circuit in a case that the auxiliary source voltage is lower than a set lower limit value, and output a second signal to the logic circuit in a case that the auxiliary source voltage is higher than a set upper limit value.

The second judging circuit is configured to detect the chopper voltage control signal, output a third signal to the logic circuit in a case that the chopper voltage control signal is turning off the chopper switch, and output a fourth signal to the logic circuit in a case that the chopper voltage control signal is not turning off the chopper switch.

The logic circuit is configured to receive an output signal of the first judging circuit, an output signal of the second judging circuit and a chopper voltage control signal, control the disconnecting switch to be on in a case that the first judging circuit outputs the second signal or the second judging circuit outputs the third signal; control the disconnecting switch to be off in a case that the first judging circuit outputs the first signal and the second judging circuit outputs the fourth signal; control the chopper switch to be off in a case that the chopper switch control signal is turning off the chopper switch; and control the chopper switch to be on in a case that the chopper switch control signal is not turning off the chopper switch.

Figure 14:
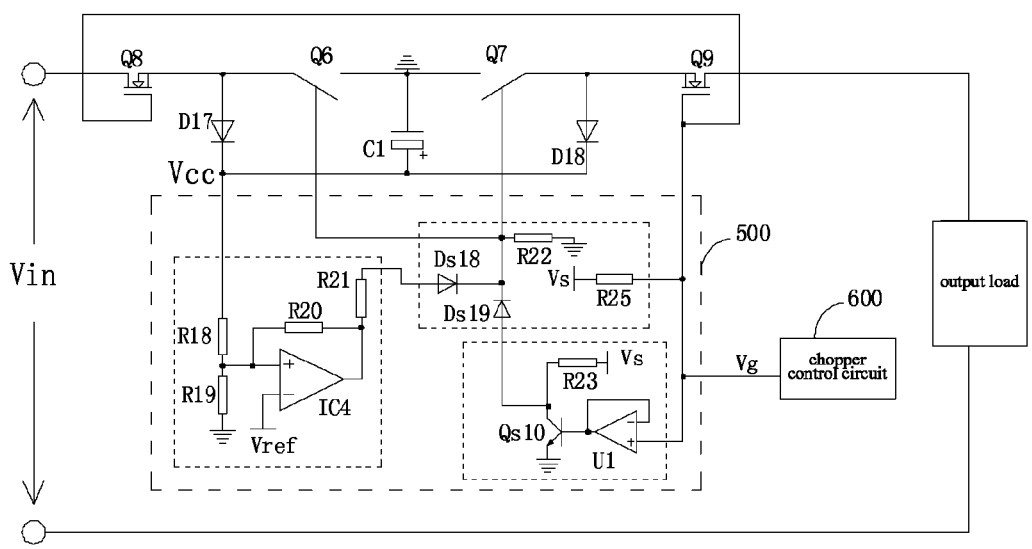
FIG. 14 is a circuit diagram of an implementation of a control device of the auxiliary power supply circuit according to the third embodiment of the present invention.

An implementation of the control device of the auxiliary power supply circuit according to the third embodiment of the present invention may be as the circuit shown in FIG. 14. FIG. 14 is a circuit diagram of an implementation of the control device of the auxiliary power supply circuit according to the third embodiment of the present invention. In the circuit shown in FIG. 14, the chopper switch 100 consists of two MOS transistors.

As shown in FIG. 14, the auxiliary source capacitor 200 is C1, the disconnecting switch 300 includes a sixth switch transistor Q6 and a seventh switch transistor Q7, and the rectifier device includes a seventeenth diode D17 and an eighteenth diode D18.

In the parallel branch consisting of the auxiliary source capacitor, the rectifier device and the disconnecting switch, the negative electrode of the auxiliary source capacitor C1 is connected to the ground, and the positive electrode of the auxiliary source capacitor C1 is connected to the cathode of the seventeenth diode D17 and the cathode of the eighteenth diode D18; the two ends of the sixth switch transistor Q6 are respectively connected to the negative electrode of the auxiliary source capacitor C1 and the anode of the seventeenth diode D17; and the two ends of the seventh switch transistor Q7 are respectively connected to the negative electrode of the auxiliary source capacitor C1 and the anode of the eighteenth diode D18.

The chopper switch 100 includes an eighth MOS transistor Q8 and a ninth MOS transistor Q9.

The source electrode of the eighth MOS transistor Q8 is connected to a common end of the sixth switch transistor Q6 and the anode of the seventeenth diode D17, and the drain electrode of the eighth MOS transistor Q8 is connected to an end of the input voltage Vin.

The source electrode of the ninth MOS transistor Q9 is connected to a common end of the seventh switch transistor Q7 and the anode of the eighteenth diode D18, and the drain electrode of the ninth MOS transistor Q9 is connected to an end of the output load.

The other end of the alternating current input voltage Vin is connected to the other end of the output load.

The gate electrode of the eighth MOS transistor Q8 and the gate electrode of the ninth MOS transistor Q9 are connected together, and as the control end of the chopper switch 100, are connected to the output end of the control device 500. The control end of the sixth switch transistor Q6 and the control end of the seventh switch transistor Q7 are connected together and are used as the control end of the disconnecting switch 300.

The voltage across the auxiliary source capacitor C1 is the auxiliary source voltage Vcc.

As shown in FIG. 14, the control device 500 includes a first judging circuit, a second judging circuit and a logic circuit.

The first judging circuit includes an eighteenth resistor R18, a nineteenth resistor R19, a twentieth resistor R20, a twenty-first resistor R21 and a fourth comparator IC4. The eighteenth resistor R18, the nineteenth resistor R19, the twentieth resistor R20 and the fourth comparator IC4 form a hysteresis comparator, and its principle is the same as that of the judging circuit in FIG. 3. In the embodiment, a first signal and a second signal, being signals output from the first judging circuit, are a low level signal and a high level signal respectively.

An end of the eighteenth resistor R18, as an input end of the control device 500, is connected to the positive electrode of the auxiliary source capacitor C1, and an end of the nineteenth resistor R19 is connected to the ground.

The other end of the eighteenth resistor R18 and the other end of the nineteenth resistor R19 are connected to the non-inverted input end of the fourth comparator IC4; the inverted input end of the fourth comparator IC4 is connected to a reference voltage Vref, and the twentieth resistor R20 is connected between the non-inverted input end and the output end of the fourth comparator IC4; and the output end of the fourth comparator IC4 is connected to an end of the twenty-first resistor R21.

The second judging circuit includes a first integrated operational amplifier U1, a twenty-third resistor R23, a tenth transistor Qs10 and a second auxiliary power supply Vs. In the embodiment, a third signal and a fourth signal, being signals output from the second judging circuit, are a high level signal and a low level signal.

The base of the tenth transistor Qs10 is connected to the output end of the first integrated operational amplifier U1; the inverted input end and the output end of the first integrated operational amplifier U1 are connected together, and the non-inverted input end of the first integrated operational amplifier U1 is connected to the chopper voltage control signal Vg output from the chopper control circuit 600, and as a first output end of the control device 500, is connected to the control end of the chopper switch 100 (i.e., the gate electrode of the eighth MOS transistor Q8 and the gate electrode of the ninth MOS transistor Q9).

The emitter of the tenth transistor Qs10 is connected to the ground, the collector of the tenth transistor Qs10 is connected to an end of the twenty-third resistor R23 and the anode of the nineteenth diode Ds19, and the other end of the twenty-third resistor R23 is connected to the positive electrode of the second auxiliary power supply Vs.

The logic circuit includes a twenty-fifth resistor R25, an eighteenth diode Ds18, a nineteenth diode Ds19 and a twenty-second resistor R22.

The other end of the twenty-first resistor R21 is connected to the anode of the eighteenth diode Ds18.

The twenty-fifth resistor R25 is connected between the control end of the chopper switch 100 and the positive electrode of the second auxiliary power supply Vs; and the cathode of the nineteenth diode Ds19 and the cathode of the eighteenth diode Ds18 are connected together, and as a second output end of the control device 500, is connected to the control end of the disconnecting switch 300 (i.e., the control end of the sixth switch transistor Q6 and the control end of the seventh switch transistor Q7).

The twenty-second resistor R22 is connected between the control end of the disconnecting switch 300 and the ground.

The control end of the chopper switch 10 (i.e., the gate electrode of the eighth MOS transistor Q8 and the gate electrode of the ninth MOS transistor Q9) is connected to the chopper voltage control signal Vg output from the chopper control circuit 600.

The voltage across the auxiliary source capacitor C1 is the auxiliary source voltage Vcc.

In FIG. 14, the chopper voltage control signal Vg may be output by the chopper control circuit 600, and the chopper control circuit 600 is configured to control the two-wire dimmer to output a chopper voltage.

It should be noted that in the embodiment of the present invention, the gate electrode driving current of the eighth MOS transistor Q8 and the ninth MOS transistor Q9 of the chopper switch 100 is provided by the second auxiliary power supply Vs via the twenty-fifth resistor R25, and the chopper voltage control signal Vg output from the chopper control circuit 600 is a voltage which only used for turning off the chopper switch 100.

The second judging circuit detects the chopper voltage control signal, and in a case that the chopper voltage control signal Vg is turning off the chopper switch, that is, Vg is at a low level, the gate electrodes of the eighth MOS transistor Q8 and the ninth MOS transistor Q9 of the chopper switch 100 are controlled to be at low level via the logic circuit, and the eighth MOS transistor Q8 and the ninth MOS transistor Q9 are turned off. A high level signal (i.e., the third signal) is output to the logic circuit by inverting of the tenth transistor Qs10, and the nineteenth diode Ds19 in the logic circuit is turned on, which controls the control end of the sixth switch transistor Q6 and the seventh switch transistor Q7 of the disconnecting switch 300 to be at high level, the sixth switch transistor Q6 and the seventh switch transistor Q7 are turned on. The voltage across the disconnecting switch 300 turned on is low, which cause the seventeenth diode D17 and the eighteenth diode D18 to be turned off, the auxiliary source capacitor C1 is not charged, and the dimmer outputs a zero voltage.

The second judging circuit detects the chopper voltage control signal Vg, and in a case that the chopper voltage control signal Vg is not turning off the chopper switch, that is, Vg is at a high level, the gate electrodes of the eighth MOS transistor Q8 and the ninth MOS transistor Q9 of the chopper switch 100 are at a high level of the second auxiliary power supply Vs via the twenty-fifth resistor R25 in the logic circuit, and the eighth MOS transistor Q8 and the ninth MOS transistor Q9 are turned on. A low level signal (i.e., the fourth signal) is output to the logic circuit by inverting of the tenth transistor Qs10, such that the nineteenth diode Ds19 in the logic circuit is turned off, that is, the second judging circuit does not control the disconnecting switch 300.

Based on the above, the first judging circuit detects the auxiliary source voltage Vcc. In a case that the auxiliary source voltage Vcc is lower than a set lower limit value, the fourth comparator IC4 outputs a low level signal (i.e., the first signal) to the logic circuit, the eighteenth diode Ds18 of the logic circuit is turned off, that is, the first judging circuit does not control the disconnecting switch 300; since both the first judging circuit and the second judging circuit do not control the disconnecting switch 300, the control ends of the sixth switch transistor Q6 and the seventh switch transistor Q7 of the disconnecting switch 300 are at low level via the twenty-second resistor R22 in the logic circuit, the sixth switch transistor Q6 and the seventh switch transistor Q7 are turned off, and their voltage drops charge the auxiliary source capacitor C1 via the seventeenth diode D17 or the eighteenth diode D18; the output voltage V0 of the two-wire dimmer is the difference between the input alternating current voltage Vin and the auxiliary source voltage Vcc, and the two-wire dimmer outputs a non-zero voltage; and in a case that the auxiliary source voltage Vcc is higher than a set upper limit value, the fourth comparator IC4 outputs a high level signal (i.e., the second signal) to the logic circuit, the eighteenth diode Ds18 of the logic circuit is turned on, the first judging circuit controls the control ends of the sixth switch transistor Q6 and the seventh switch transistor Q7 of the disconnecting switch 300 to be at high level, and the sixth switch transistor Q6 and the seventh switch transistor Q7 are turned on; the voltage drops across the sixth switch transistor Q6 and the seventh switch transistor Q7 are low, the seventeenth diode D17 or the eighteenth diode D18 is turned off, and the auxiliary source capacitor C1 is not charged; the output voltage of the two-wire dimmer is the input alternating current voltage Vin, which is a non-zero voltage.

The embodiment described above only provides an implementation of the auxiliary power supply circuit of the two-wire dimmer according to the third embodiment of the present invention. In practical application, the auxiliary power supply circuit of the two-wire dimmer according to the third embodiment of the present invention may be but not limited to the implementation described above.

Figure 15:
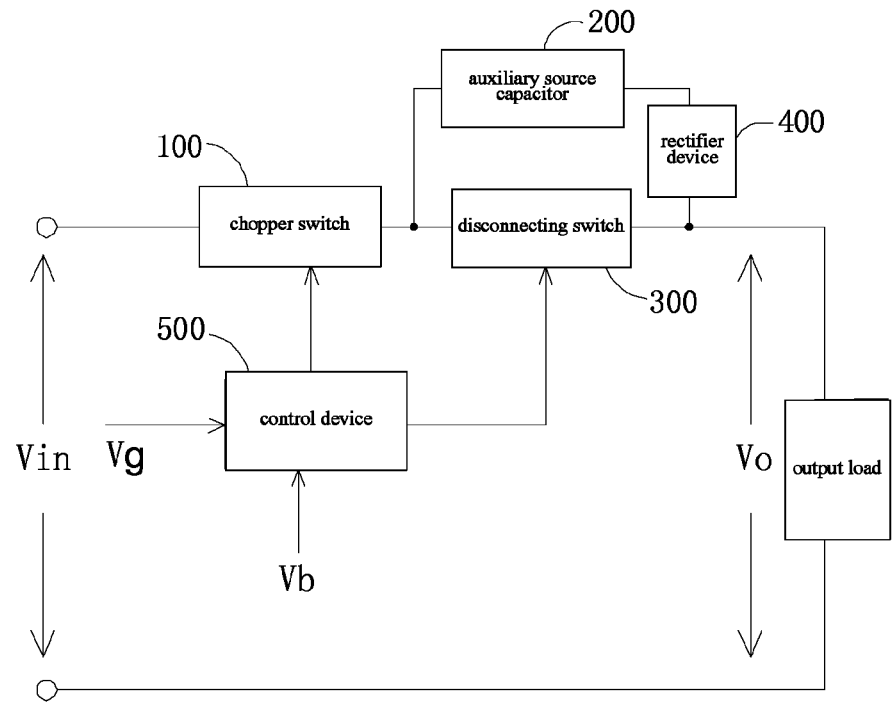
FIG. 15 is a structural diagram of an auxiliary power supply circuit of a two-wire dimmer according to a fourth embodiment of the present invention.

FIG. 15 is a structural diagram of an auxiliary power supply circuit of a two-wire dimmer according to a fourth embodiment of the present invention. The circuit of the fourth embodiment shown in FIG. 15 differs from the circuit of the third embodiment shown in FIG. 14 in that: the control device 500 detects the auxiliary source voltage and receives the chopper voltage control signal Vg and the chopper period control signal Vb, judges whether the chopper switch 100 is in a chopper period according to the chopper period control signal Vb, outputs a signal to control the disconnecting switch 300 and the chopper switch 100 to be on or off according to a comparison result of the auxiliary source voltage with a preset voltage, a state of the chopper voltage control signal Vg and whether the chopper switch 100 being in a chopper period, to control the charging of the auxiliary source capacitor 200 via the rectifier device 400.

As shown in FIG. 15, the chopper period control signal Vb may be output by a chopper control circuit (not shown in the figures). The chopper period control signal Vb has two states, the chopper period control signal Vb is in a first state in a case that the chopper switch 100 is in a chopper period; and the chopper period control signal Vb is in a second state in a case that the chopper switch 100 is in a non-chopper period. The control device 500 may judge whether the chopper switch 100 is in a chopper period or a non-chopper period according to the state of the chopper period control signal Vb. The control device 500 controls the auxiliary source capacitor to be charged in a non-chopper period according to the chopper period control signal Vb in a case that the auxiliary source voltage is lower than a set lower limit value.

An implementation of the auxiliary power supply circuit is provided according to the fourth embodiment of the present invention. In the auxiliary power supply circuit of the two-wire dimmer according to the fourth embodiment of the present invention, the control device may include a first judging circuit, a second judging circuit and a logic circuit.

The first judging circuit is configured to detect the auxiliary source voltage, compare the auxiliary source voltage with a preset voltage, output a first signal to the logic circuit in a case that the auxiliary source voltage is lower than a set lower limit value, and output a second signal to the logic circuit in a case that the auxiliary source voltage is higher than a set upper limit value.

The second judging circuit is configured to detect the chopper period control signal, judge whether the chopper switch is in a chopper period according to the chopper period control signal, output a third signal to the logic circuit in a case that the chopper switch is in a chopper period, and output a fourth signal to the logic circuit in a case that the chopper switch is in a non-chopper period.

The logic circuit is configured to receive an output signal of the first judging circuit, an output signal of the second judging circuit and a chopper voltage control signal, control the disconnecting switch to be on in a case that the first judging circuit outputs the second signal or the second judging circuit outputs the third signal; control the disconnecting switch to be off in a case that the first judging circuit outputs the first signal and the second judging circuit outputs the fourth signal; control the chopper switch to be off in a case that the chopper switch control signal is turning off the chopper switch; and control the chopper switch to be on in a case that the chopper switch control signal is not turning off the chopper switch.

Figure 16:
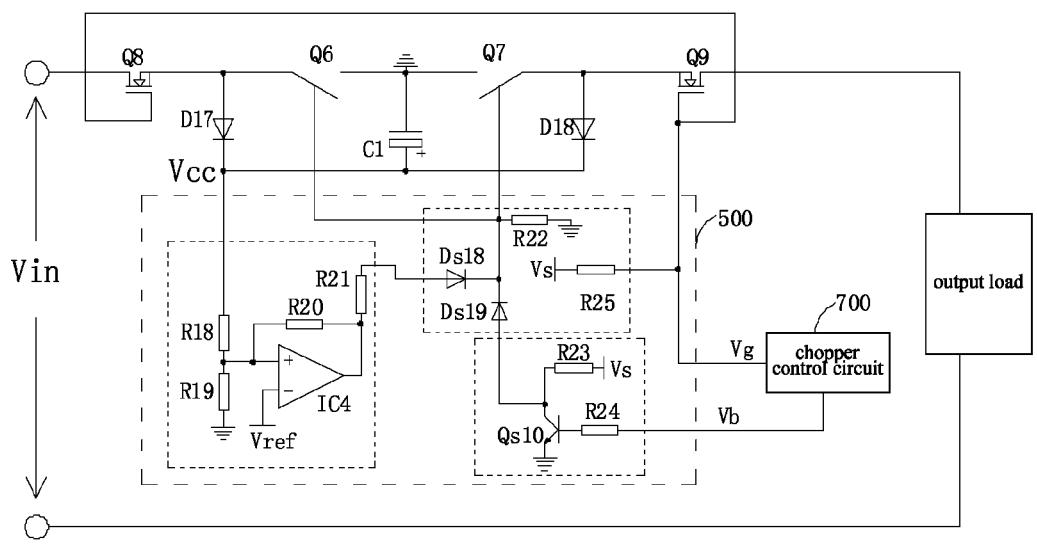
FIG. 16 is a circuit diagram of an implementation of a control device of the auxiliary power supply circuit according to the fourth embodiment of the present invention.

An implementation of the control device of the auxiliary power supply circuit of the fourth embodiment of the present invention may be as the circuit shown in FIG. 16. FIG. 16 is a circuit diagram of an implementation of the control device of the auxiliary power supply circuit according to the fourth embodiment of the present invention. As shown in FIG. 16, the chopper switch 100 consists of two MOS transistors.

As shown in FIG. 16, the auxiliary source capacitor 200 is C1, the disconnecting switch 300 includes a sixth switch transistor Q6 and a seventh switch transistor Q7, and the rectifier device includes a seventeenth diode D17 and an eighteenth diode D18.

In the parallel branch consisting of the auxiliary source capacitor, the rectifier device and the disconnecting switch, the negative electrode of the auxiliary source capacitor C1 is connected to the ground, the positive electrode of the auxiliary source capacitor C1 is connected to the cathode of the seventeenth diode D17 and the cathode of the eighteenth diode D18; the two ends of the sixth switch transistor Q6 are respectively connected to the negative electrode of the auxiliary source capacitor C1 and the anode of the seventeenth diode D17; and the two ends of the seventh switch transistor Q7 are respectively connected to the negative electrode of the auxiliary source capacitor C1 and the anode of the eighteenth diode D18.

The chopper switch 100 includes an eighth MOS transistor Q8 and a ninth MOS transistor Q9. The source electrode of the eighth MOS transistor Q8 is connected to a common end of the sixth switch transistor Q6 and the anode of the seventeenth diode D17, and the drain electrode of the eighth MOS transistor Q8 is connected to an end of the input voltage Vin. The source electrode of the ninth MOS transistor Q9 is connected to a common end of the seventh switch transistor Q7 and the anode of the eighteenth diode D18, and the drain electrode of the ninth MOS transistor Q9 is connected to an end of the output load. The other end of the alternating current input voltage Vin is connected to the other end of the output load. The gate electrode of the eighth MOS transistor Q8 and the gate electrode of the ninth MOS transistor Q9 are connected together, and as the control end of the chopper switch 100, is connected to the output end of the control device 500. The control end of the sixth switch transistor Q6 and the control end of the seventh switch transistor Q7 are connected together and are used as the control end of the disconnecting switch 300.

The control device shown in FIG. 16 differs from that in FIG. 14 in that: the other end of the twenty-fourth resistor R24 of the control device 500 is connected to the chopper period control signal Vb output from the chopper control circuit 700, and the control end of the chopper switch 100 (i.e., the gate electrode of the eighth MOS transistor Q8 and the gate electrode of the ninth MOS transistor Q9) is connected to the chopper voltage control signal Vg output from the chopper control circuit 700.

The control device 500 includes a first judging circuit, a second judging circuit and a logic circuit.

The first judging circuit includes an eighteenth resistor R18, a nineteenth resistor R19, a twentieth resistor R20, a twenty-first resistor R21 and a fourth comparator IC4. The eighteenth resistor R18, the nineteenth resistor R19, the twentieth resistor R20 and the fourth comparator IC4 form a hysteresis comparator, as the judging circuit in FIG. 3. In the embodiment, a first signal and a second signal, being signals output from the first judging circuit, are a low level signal and a high level signal respectively.

An end of the eighteenth resistor R18, as an input end of the control device 500, is connected to the positive electrode of the auxiliary source capacitor C1, and an end of the nineteenth resistor R19 is connected to the ground.

The other end of the eighteenth resistor R18 and the other end of the nineteenth resistor R19 are connected to the non-inverted input end of the fourth comparator IC4, the inverted input end of the fourth comparator IC4 is connected to a reference voltage Vref, and the twentieth resistor R20 is connected between the non-inverted input end and the output end of the fourth comparator IC4.

The output end of the fourth comparator IC4 is connected to an end of the twenty-first resistor R21, and the other end of the twenty-first resistor R21 is connected to the anode of the eighteenth diode Ds18.

The second judging circuit includes a twenty-third resistor R23, a twenty-fourth resistor R24, a tenth transistor Qs10 and a second auxiliary power supply Vs. In the embodiment, a third signal and a fourth signal, being signals output from the second judging circuit, are a high level signal and a low level signal respectively.

The base of the tenth transistor Qs10 is connected to an end of the twenty-fourth resistor R24, and the other end of the twenty-fourth resistor R24 is connected to the chopper period control signal Vb output from the chopper control circuit 700.

The emitter of the tenth transistor Qs10 is connected to the ground, the collector of the tenth transistor Qs10 is connected to an end of the twenty-third resistor R23 and the anode of the nineteenth diode Ds19, and the other end of the twenty-third resistor R23 is connected to the positive electrode of the second auxiliary power supply Vs.

The logic circuit includes a twenty-fifth resistor R25, an eighteenth diode Ds18, a nineteenth diode Ds19 and a twenty-second resistor R22.

An end of the twenty-fifth resistor R25 is connected to the positive electrode of the second auxiliary power supply Vs, the other end of the twenty-fifth resistor R25 is connected to the chopper voltage control signal Vg output from the chopper control circuit 700, and as a first output end of the control device 500, is connected to the control end of the chopper switch 100 (i.e., the gate electrode of the eighth MOS transistor Q8 and the gate electrode of the ninth MOS transistor Q9).

The cathode of the nineteenth diode Ds19 and the cathode of the eighteenth diode Ds18 are connected together, and as a second output end of the control device 500, is connected to the control end of the disconnecting switch 300 (i.e., the control end of the sixth switch transistor Q6 and the control end of the seventh switch transistor Q7).

The twenty-second resistor R22 is connected between the second output end of the control device 500 and the ground.

In FIG. 16, the chopper period control signal Vb may be output by the chopper control circuit 700, and has two states: a high level state and a low level state.

The second judging circuit detects the chopper period control signal Vb, and in a case that the chopper switch 100 is in a chopper period, the chopper period control signal Vb is at a low level, a high level signal (i.e., the third signal) is output to the logic circuit by inverting of the tenth transistor Qs10, the nineteenth diode Ds19 in the logic circuit is turned on, and the second judging circuit controls the control ends of the sixth switch transistor Q6 and the seventh switch transistor Q7 of the disconnecting switch 300 to be at high level, and the sixth switch transistor Q6 and the seventh switch transistor Q7 are turned on. The turn-on voltage drops of the sixth switch transistor Q6 and the seventh switch transistor Q7 are low, the seventeenth diode D17 and the eighteenth diode D18 are turned off, and the auxiliary source capacitor C1 is not charged. The chopper switch 100 is controlled to be off directly in a case that the chopper voltage control signal Vg is turning off the chopper switch 100, and the chopper switch 100 is controlled to be on via the resistor R25 and the second auxiliary power supply Vs in the logic circuit in a case that the chopper voltage control signal Vg is not turning off the chopper switch.

The second judging circuit detects the chopper period control signal Vb, and in a case that the chopper switch 100 is in a non-chopper period, the two-wire dimmer does not output the zero voltage, that is, the chopper voltage control signal Vg is not at a low level, and the chopper switch 100 is on. The chopper period control signal Vb is at a high level, and a low level signal (i.e., the fourth signal) is output to the logic circuit by inverting of the tenth transistor Qs10, therefore, the nineteenth diode Ds19 is turned off, that is, the second judging circuit does not control the disconnecting switch 300 to be on or off.

The first judging circuit detects the auxiliary source voltage Vcc, and in a case that the auxiliary source voltage Vcc is higher than an upper limit value, the fourth comparator IC4 outputs a high level signal (i.e., the second signal) to the logic circuit, the eighteenth diode Ds18 in the logic circuit is turned on, the first judging circuit controls the control ends of the sixth switch transistor Q6 and the seventh switch transistor Q7 of the disconnecting switch 300 to be at a high level, and the sixth switch transistor Q6 and the seventh switch transistor Q7 are turned on. The turn-on voltage drops of the sixth switch transistor Q6 and the seventh switch transistor Q7 are low, the seventeenth diode D17 and the eighteenth diode D18 are turned off, and the auxiliary source capacitor C1 is not charged.

The first judging circuit detects the auxiliary source voltage Vcc, and in a case that the auxiliary source voltage Vcc is lower than a lower limit value, the fourth comparator IC4 outputs a low level signal (i.e., the first signal) to the logic circuit, the eighteenth diode Ds18 in the logic circuit is turned off, that is, the first judging circuit does not control the disconnecting switch 300 to be on or off. Since both the first judging circuit and the second judging circuit do not control the disconnecting switch 300 to be on or off, the control ends of the sixth switch transistor Q6 and the seventh switch transistor Q7 of the disconnecting switch 300 are at low level via the twenty-second resistor R22 in the logic circuit, and the sixth switch transistor Q6 and the seventh switch transistor Q7 are turned off. The voltage drops of the sixth switch transistor Q6 and the seventh switch transistor Q7 make the seventeenth diode D17 and the eighteenth diode D18 be turned on, and the auxiliary source capacitor C1 is charged.

In the implementations of the auxiliary power supply circuit of the two-wire dimmer provided by the third embodiment and the fourth embodiment described above, the chopper switch 100 consists of two MOS transistors. In practical application, the chopper switch 100 may be implemented in many ways. Several implementations of the chopper switch will be described in detail below.

Figure 17:
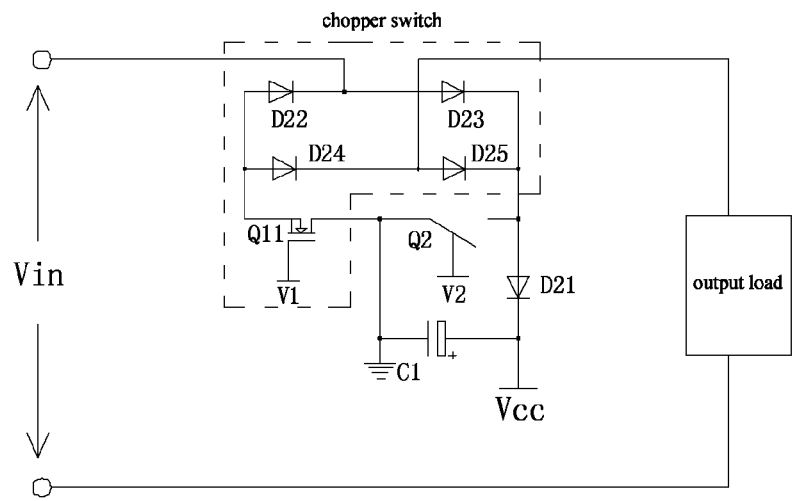
FIG. 17 is a circuit diagram of a fifth implementation of the chopper switch according to an embodiment of the present invention.

FIG. 17 is a circuit diagram of a fifth implementation of the chopper switch according to an embodiment of the present invention. As shown in FIG. 17, the chopper switch 100 consists of a rectifier bridge and a unidirectional switch.

As shown in FIG. 17, the auxiliary source capacitor 200 is C1, the disconnecting switch 300 is Q2, and the rectifier device is D21. The auxiliary source capacitor C1 and the rectifier device D21 are connected in series to form a series branch, the series branch and the disconnecting switch Q2 are connected in parallel to form a parallel branch; and the chopper switch 100 is connected in series with the parallel branch.

In the parallel branch, the negative electrode of the auxiliary source capacitor C1 is connected to a common reference end (the ground), the positive electrode of the auxiliary source capacitor C1 is connected to the cathode of the rectifier device D21, and the two ends of the disconnecting switch Q2 are respectively connected to the negative electrode of the auxiliary source capacitor C1 and the anode of the rectifier device D21.

The chopper switch 100 is a bidirectional switch consisting of a switch transistor Q11 and a rectifier bridge. The rectifier bridge consists of a twenty-second diode D22, a twenty-third diode D23, a twenty-fourth diode D24 and a twenty-fifth diode D25.

The twenty-second diode D22 is connected in series with the twenty-third diode D23, and the cathode of the twenty-second diode D22 is connected to the anode of the twenty-third diode D23.

The twenty-fourth diode D24 is connected in series with the twenty-fifth diode D25, and the cathode of the twenty-fourth diode D24 is connected to the anode of the twenty-fifth diode D25.

The anode of the twenty-second diode D22 and the anode of the twenty-fourth diode D24 are connected to the source electrode of the switch transistor Q11, and the cathode of the twenty-third diode D23 and the cathode of the twenty-fifth diode D25 are connected to a common end of the anode of the rectifier device D21 and the disconnecting switch Q2.

The drain electrode of the switch transistor Q11 is connected to a common end of the disconnecting switch Q2 and the negative electrode of the auxiliary source capacitor C1.

A common end of the twenty-second diode D22 and the twenty-third diode D23, as an end of the two-wire dimmer, is connected to the input voltage Vin, and a common end of the twenty-fourth diode D24 and the twenty-fifth diode D25, as the other end of the two-wire dimmer, is connected to the output load, and the output voltage of the two-wire dimmer is Vo.

The two-wire dimmer and the load are connected in series, and then connected in parallel with the input Vin.

The gate electrode of the switch transistor Q11 is connected to a first signal V1, and the control end of the disconnecting switch Q2 is connected to a second signal V2.

The voltage across the auxiliary source capacitor C1 is the auxiliary source voltage Vcc.

It should be noted that the switch transistor Q11 which forms the chopper switch 100 shown in FIG. 17 is described by taking a MOS transistor as an example. In practical application, any unidirectional switch transistor may be used as the switch transistor Q1 shown in the figures to form the chopper switch of the embodiment of the present invention.

In the circuit shown in FIG. 17, in a case that the switch transistor Q11 is controlled to be on and the disconnecting switch Q2 is controlled to be off, the two-wire dimmer obtains the auxiliary source voltage, and the output voltage V0 is a difference between the input voltage Vin and the auxiliary source voltage Vcc. In a case that the switch transistor Q11 is controlled to be on and the disconnecting switch Q2 is controlled to be on, the auxiliary source capacitor C1 is discharged, and the output voltage is equal to the input voltage Vin. In a case that the switch transistor Q11 is controlled to be off and the disconnecting switch Q2 is controlled to be on, the auxiliary source capacitor C1 is discharged to an auxiliary source load (not shown in the figures), and the output voltage is zero.

Figure 18:
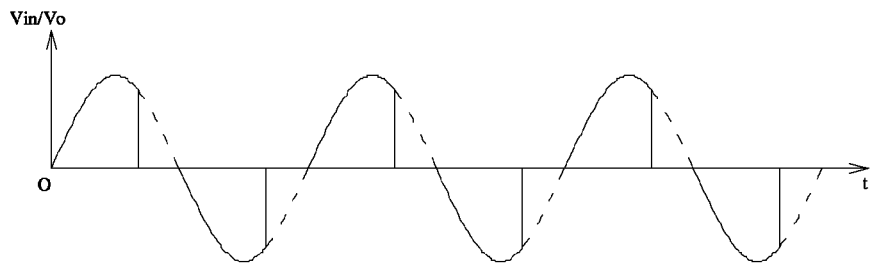
FIG. 18 is a diagram of a waveform of an output voltage of the circuit shown in FIG. 17.

In the auxiliary power supply circuit shown in FIG. 17, in a case that the two-wire dimmer outputs a zero voltage and a non-zero voltage alternately in a half period of the alternating current voltage Vin, the output voltage of the two-wire dimmer is a chopper voltage. Specifically, in a case that the chopper voltage control signal Vg of the circuit shown in FIG. 17 is a control signal of a trailing edge dimmer, the waveform of the output voltage V0 may be as shown in FIG. 18.

Figure 19:
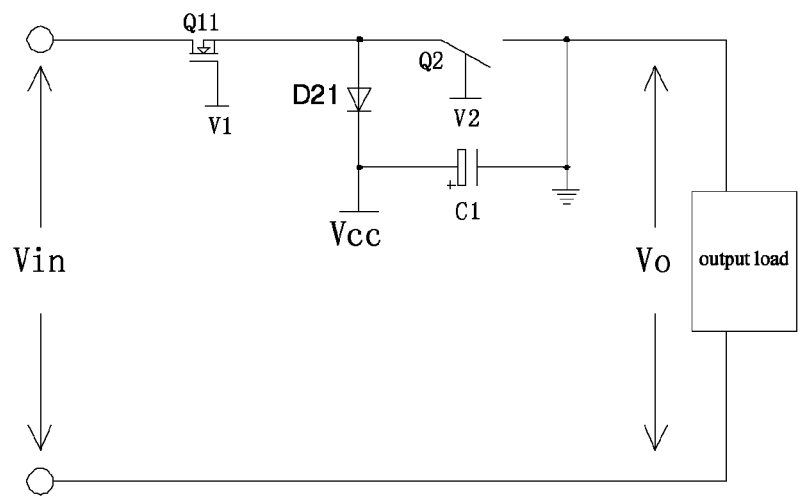
FIG. 19 is a circuit diagram of a sixth implementation of the chopper switch according to an embodiment of the present invention.

FIG. 19 is a circuit diagram of a sixth implementation of the chopper switch according to an embodiment of the present invention. In the circuit shown in FIG. 19, the chopper switch 100 consists of a unidirectional switch.

As shown in FIG. 19, the auxiliary source capacitor 200 is C1, the disconnecting switch 300 is Q2, and the rectifier device is D21. The auxiliary source capacitor C1 and the rectifier device D21 are connected in series to form a series branch, the series branch and the disconnecting switch Q2 are connected in parallel to form a parallel branch; and the chopper switch 100 is connected in series with the parallel branch.

In the parallel branch, the negative electrode of the auxiliary source capacitor C1 is connected to an end of the output load, the positive electrode of the auxiliary source capacitor C1 is connected to the cathode of the rectifier device D21, and the two ends of the disconnecting switch Q2 are respectively connected to the negative electrode of the auxiliary source capacitor C1 and the anode of the rectifier device D21.

The chopper switch 100 includes a switch transistor Q11. The source electrode of the switch transistor Q11 is connected to a common end of the disconnecting switch Q2 and the anode of the rectifier device D21, and the drain electrode of the switch transistor Q11 is connected to an end of the input voltage Vin.

The other end of the input voltage Vin is connected to the other end of the output load.

The gate electrode of the switch transistor Q11 is connected to the first signal V1; and the control end of the disconnecting switch Q2 is connected to the second signal V2.

The voltage across the auxiliary source capacitor C1 is the auxiliary source voltage Vcc.

Figure 20:
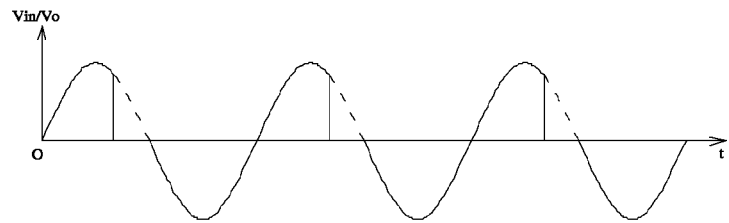
FIG. 20 is a diagram of a waveform of an output voltage of the circuit shown in FIG. 19.

The operating principle of the circuit shown in FIG. 19 is similar to that in FIG. 17, and the detailed description thereof is omitted. The circuit shown in FIG. 19 differs from the circuit shown in FIG. 17 in that: the chopper voltage is output in a half period and the body diode of the switch transistor Q5 is turned on in the other half period in a case that the two-wire dimmer outputs a chopper voltage. That is, the chopper voltage is output in a half period and the alternating current input voltage is output in the other half period in one alternating current period of the chopper voltage output from the two-wire dimmer. Specifically, the waveform of the output voltage of the circuit shown in FIG. 19 is shown in FIG. 20.

It should be noted that the switch transistor Q11 which forms the chopper switch 100 shown in FIG. 19 is described by taking the MOS transistor as an example. In practical application, the switch transistor Q11 shown in FIG. 19 may be replaced by inversely connecting a unidirectional switch transistor with a diode in parallel, to form the chopper switch in the embodiment of the present invention. For example, the chopper switch 100 may be a circuit shown in FIG. 21.

Figure 21:
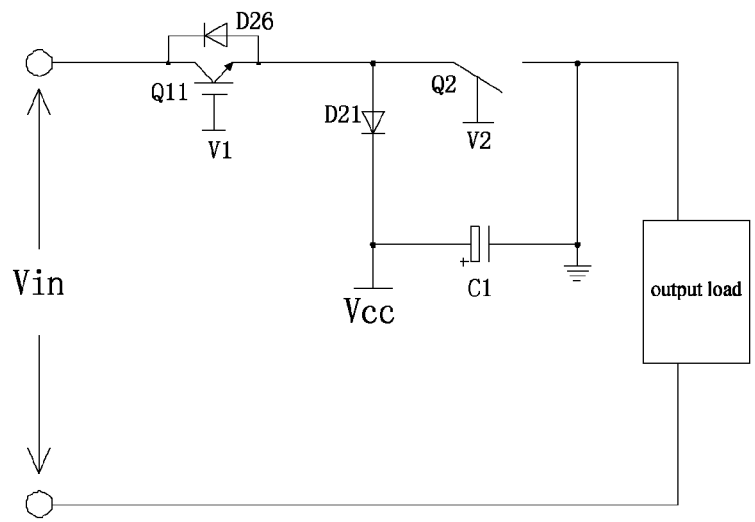
FIG. 21 is a circuit diagram of a seventh implementation of the chopper switch according to an embodiment of the present invention.

FIG. 21 is a circuit diagram of a seventh implementation of the chopper switch according to an embodiment of the present invention. In the circuit shown in FIG. 21, the chopper switch 100 consists of a unidirectional switch. The circuit shown in FIG. 21 differs from the circuit shown in FIG. 19 in that, a switch transistor Q11 is inversely connected in parallel with a diode D26 to replace Q11 in FIG. 19.

As shown in FIG. 21, the structure of the parallel branch is the same as that in FIG. 19, and the detailed description thereof is omitted.

The chopper switch 100 includes a switch transistor Q11 and a twenty-sixth diode D26. The emitter of the switch transistor Q11 is connected to a common end of the disconnecting switch Q2 and the anode of the rectifier device D21, and the collector of the switch transistor Q11 is connected to the input voltage Vin.

The cathode of the twenty-sixth diode D26 is connected to the collector of the switch transistor Q11, and the anode of the twenty-sixth diode D26 is connected to the emitter of the switch transistor Q11.

The gate electrode of the switch transistor Q11 is connected to a first signal V1, and the control end of the disconnecting switch Q2 is connected to a second signal V2.

The voltage across the auxiliary source capacitor C1 is the auxiliary source voltage Vcc.

The operating principle of the circuit shown in FIG. 21 is similar to that in FIG. 19, and the detailed description is omitted herein.

Figure 22:
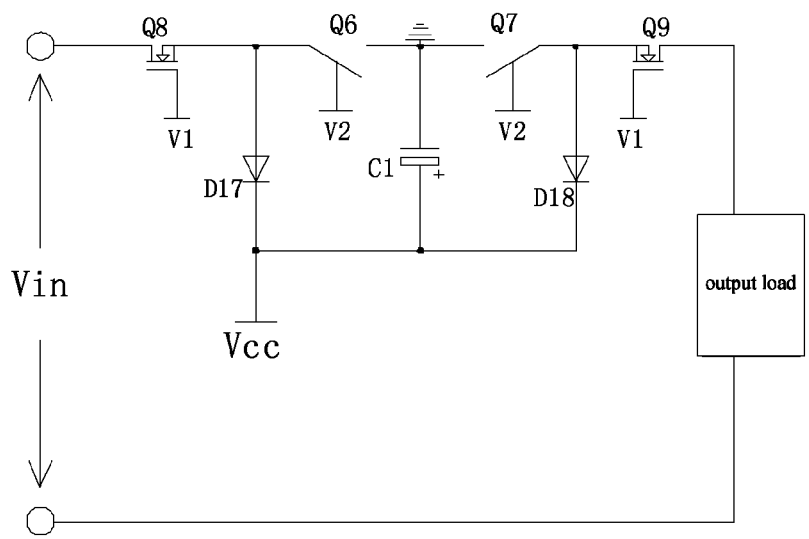
FIG. 22 is a circuit diagram of an eighth implementation of the chopper switch according to an embodiment of the present invention.

FIG. 22 is a circuit diagram of an eighth implementation of the chopper switch according to an embodiment of the present invention. In the circuit shown in FIG. 22, the chopper switch 100 consists of two MOS transistors.

As shown in FIG. 22, the auxiliary source capacitor 200 is C1, the disconnecting switch 300 includes a sixth switch transistor Q6 and a seventh switch transistor Q7, and the rectifier device includes a seventeenth diode D17 and an eighteenth diode D18.

In the parallel branch consisting of the auxiliary source capacitor, the rectifier device and the disconnecting switch, the negative electrode of the auxiliary source capacitor C1 is connected to the ground, the positive electrode of the auxiliary source capacitor C1 is connected to the cathode of the seventeenth diode D17 and the cathode of the eighteenth diode D18, the two ends of the sixth switch transistor Q6 are respectively connected to the negative electrode of the auxiliary source capacitor C1 and the anode of the seventeenth diode D17, and the two ends of the seventh switch transistor Q7 are respectively connected to the negative electrode of the auxiliary source capacitor C1 and the anode of the eighteenth diode D18.

The chopper switch 100 includes an eighth MOS transistor Q8 and a ninth MOS transistor Q9.

The source electrode of the eighth MOS transistor Q8 is connected to a common end of the sixth switch transistor Q6 and the anode of the seventeenth diode D17, and the drain electrode of the eighth MOS transistor Q8 is connected to an end of the input voltage Vin.

The source electrode of the ninth MOS transistor Q9 is connected to a common end of the seventh switch transistor Q7 and the anode of the eighteenth diode D18, and the drain electrode of the ninth MOS transistor Q9 is connected to an end of the output load.

The other end of the input voltage Vin is connected to the other end of the output load.

The gate electrode of the eighth MOS transistor Q8 and the gate electrode of the ninth MOS transistor Q9 are connected to a first control signal V1; and the control end of the sixth switch transistor Q6 and the control end of the seventh switch transistor Q7 are connected to a second control signal V2.

The voltage across the auxiliary source capacitor C1 is the auxiliary source voltage Vcc.

In the circuit shown in FIG. 22, the auxiliary source voltage Vcc is detected. The sixth switch transistor Q6 and the seventh switch transistor Q7 is controlled to be turned off in a case that the auxiliary source voltage Vcc is lower than a set lower limit value and the eighth MOS transistor Q8 and the ninth MOS transistor Q9 are turned on. In this case, in the two-wire dimmer, the auxiliary source capacitor C1 is connected in parallel with the sixth switch transistor Q6 (or the seventh switch transistor Q7) via the seventeenth diode D17 (or the eighteenth diode D18), and is connected in series with the eighth MOS transistor Q8 and the ninth MOS transistor Q9, and forms a loop together with the output load of the two-wire dimmer. The alternating current power supply charges the auxiliary source capacitor C1 through the loop, the auxiliary source voltage Vcc increases, and the output voltage of the two-wire dimmer is the difference between the input voltage Vin and the auxiliary source voltage Vcc.

The sixth switch transistor Q6 and the seventh switch transistor Q7 are controlled to be turned on in a case that the auxiliary source voltage Vcc is lower than a set lower limit value and the eighth MOS transistor Q8 and the ninth MOS transistor Q9 are turned off. In this case, the turn-on of the sixth switch transistor Q6 (or the seventh switch transistor Q7) is causes the series branch of the auxiliary source capacitor C1 and the seventeenth diode D17 (or the eighteenth diode D18) is short-circuited, the auxiliary source capacitor C1 provides power to an auxiliary source load (not shown in the figures), and the output voltage of the two-wire dimmer is zero.

All the implementations of the control device described in the third embodiment and the fourth embodiment of the present invention may be applied to the circuits of the four chopper switches provided in FIG. 17 to FIG. 22.

In the embodiments shown in FIG. 13 to FIG. 22, the disconnecting switch Q2 may be a MOS transistor or a unidirectional switch transistor which is inversely connected with a diode in parallel. Moreover, in the embodiments shown in FIG. 17 to FIG. 22, the first control signal V1 and the second control signal V2 are connected to the output ends of the control device 40 according to specific implementations.

The second auxiliary power supply Vs and the auxiliary source voltage Vcc in FIG. 2 to FIG. 23 have a common ground. Moreover, the second auxiliary power supply Vs may be replaced by the auxiliary source voltage Vcc, or may be obtained by converting the auxiliary source voltage Vcc, or does not related to the auxiliary source voltage Vcc.

Figure 23:
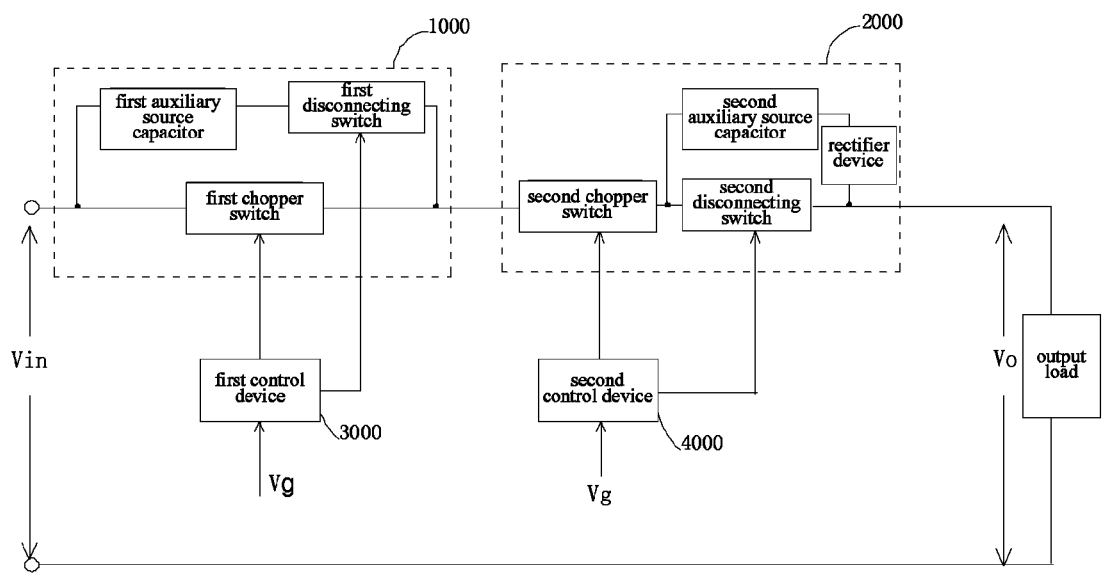
FIG. 23 is a structural diagram of an auxiliary power supply circuit of a two-wire dimmer according to a fifth embodiment of the present invention.

FIG. 23 is a structural diagram of an auxiliary power supply circuit of a two-wire dimmer according to a fifth embodiment of the present invention. The auxiliary power supply circuit includes a first power supply branch 1000 and a second power supply branch 2000.

The first power supply branch 1000 includes a first auxiliary source capacitor and a first disconnecting switch connected in series to form a first series branch; and a first chopper switch connected in parallel with the first series branch.

The second power supply branch 2000 includes a rectifier device and a second auxiliary source capacitor connected in series to form a second series branch; a second disconnecting switch connected in parallel with the second series branch to form a parallel branch; and a second chopper switch connected in series with the parallel branch.

The auxiliary power supply circuit further includes a first control device 3000 for controlling the first power supply branch, and a second control device 4000 for controlling the second power supply branch.

The first control device 3000 is configured to detect the auxiliary source voltage of the first power supply branch 1000 and receive a first chopper voltage control signal or a first chopper period control signal, output a signal to control the first chopper switch and the first disconnecting switch to be on or off according to a comparison result of the auxiliary source voltage of the first power supply branch 1000 with a preset voltage and a state of the first chopper voltage control signal or a state of the first chopper period control signal, to control the charging of the first auxiliary source capacitor.

The second control device 4000 is configured to detect the auxiliary source voltage of the second power supply branch 2000 and receive a chopper voltage control signal or a second chopper period control signal, output a signal to control the second disconnecting switch and the second chopper switch to be on or off according to a comparison result of the auxiliary source voltage of the second power supply branch 2000 with a preset voltage and a state of the chopper voltage control signal or a state of the second chopper period control signal, to charge the second auxiliary source capacitor via the rectifier device.

It should be noted that the first control device described in the fifth embodiment of the present invention is the same as the control device of the auxiliary power supply circuit described in the first embodiment of the present invention, and their specific implementations and operating principles are the same, which will not be described in detail herein. In other embodiments of the present invention, the first control device may be the control device of the auxiliary power supply circuit described in the second embodiment.

The second control device described in the fifth embodiment of the present invention is the same as the control device of the auxiliary power supply circuit described in the third embodiment of the present invention, and their specific implementations and operating principles are the same, which will not be described in detail herein. In other embodiments of the present invention, the second control device may be the control device of the auxiliary power supply circuit described in the fourth embodiment.

Figure 24:
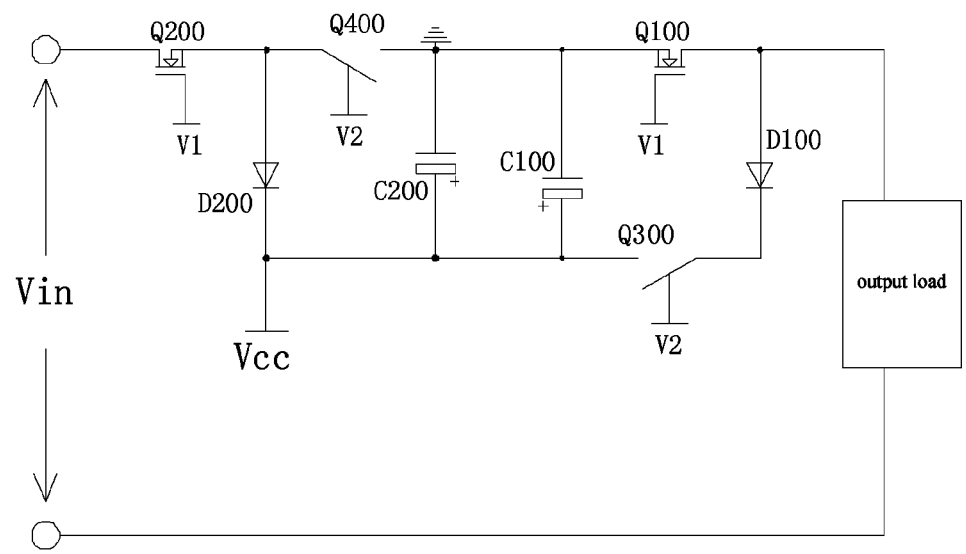
FIG. 24 is a circuit diagram of an implementation of the auxiliary power supply circuit according to the fifth embodiment of the present invention.

An implementation of the auxiliary power supply circuit is provided according to the fifth embodiment of the present invention, as shown in FIG. 24. FIG. 24 is a circuit diagram of an implementation of the auxiliary power supply circuit according to the fifth embodiment of the present invention.

As shown in FIG. 24, in the first power supply branch 1000, the first auxiliary source capacitor is C100, the first disconnecting switch is Q300, and the first chopper switch is MOS transistor Q100; the auxiliary source capacitor C100, the disconnecting switch Q300 and a diode D100 are connected in series to form a series branch; and the series branch is connected in parallel with the first chopper switch Q100.

In the series branch, the negative electrode of the first auxiliary source capacitor C100 is connected to the ground, and the positive electrode of the first auxiliary source capacitor C100 is connected to an end of the first disconnecting switch Q300; and the other end of the disconnecting switch Q300 is connected to the cathode of the diode D100, and the anode of the diode D100 is connected to an end of the output load.

The source electrode of the first chopper switch Q100 is connected to an end of the output load, and the drain electrode of the first chopper switch Q100 is connected to an end of the series branch which is connected to the ground.

In the second power supply branch 2000, the second auxiliary source capacitor is C200, the second disconnecting switch is Q400, the rectifier device is D200, and the second chopper switch is MOS transistor Q200; the second auxiliary source capacitor C200 and the rectifier device D200 are connected in series to form a series branch, then the series branch and the second disconnecting switch Q400 are connected in parallel to form a parallel branch; and the second chopper switch Q200 is connected in series with the parallel branch.

In the parallel branch, the negative electrode of the second auxiliary source capacitor C200 is connected to the ground, the positive electrode of the auxiliary source capacitor C1 is connected to the cathode of the rectifier device D200; and the two ends of the second disconnecting switch Q400 are respectively connected to the negative electrode of the second auxiliary source capacitor C1 and the anode of the rectifier device D200.

The source electrode of the second chopper switch Q200 is connected to a common end of the second disconnecting switch Q400 and the anode of the rectifier device D200, and the drain electrode of the second chopper switch Q200 is connected to an end of an input voltage Vin.

It can be seen from the embodiment that the first auxiliary source capacitor C100 and the second auxiliary source capacitor C200 may be incorporated as one capacitor.

In the circuit shown in FIG. 24, in the first power supply branch 1000, the first chopper switch Q100 and the first disconnecting switch Q300 are controlled to charge the first auxiliary source capacitor C100 via the diode D100; and in the second power supply branch 2000, the second chopper switch Q200 and the second disconnecting switch Q400 are controlled to charge the second auxiliary source capacitor C200 via the rectifier device D200.

In the circuit shown in FIG. 24, the operating principle of the first power supply branch 1000 is the same as the operating principle of the circuit shown in FIG. 9, and the operating principle of the second power supply branch 2000 is the same as the operating principle of the circuit shown in FIG. 19, which will not be described in detail herein.

In the fifth embodiment of the present invention, the first chopper switch of the first power supply branch 1000 may adopt any of the implementations shown in FIG. 7 to FIG. 12; and the second chopper switch of the second power supply branch 2000 may adopt any of the implementations shown in FIG. 17 to FIG. 22.

The auxiliary power supply circuit of the two-wire dimmer provided by the present invention is described in detail above. The principle and the embodiments of the present invention are described by detailed examples which are only for understanding the method and the core idea of the present invention. For those skilled in the art, some changes may be made on specific implementations and applications according to the idea of the present invention. Therefore, the content of the disclosure should not be understood as the limit to the present invention.

The invention claimed is:

1. An auxiliary power supply circuit of a two-wire dimmer, comprising:
   an auxiliary source capacitor and a disconnecting switch connected in series to form a series branch;
   a chopper switch connected in parallel with the series branch; and
   a control device connected to the chopper switch and the disconnecting switch,
   wherein the control device is configured to detect an auxiliary source voltage and receive a chopper voltage control signal, and output a signal to control the chopper switch and the disconnecting switch to be on or off according to a comparison result of the auxiliary source voltage with a preset voltage and a state of the chopper voltage control signal, to control charging of the auxiliary source capacitor;
   wherein the control device comprises a judging circuit and a disconnecting switch driving circuit, the judging circuit is configured to:
      receive the chopper voltage control signal, and output a signal to control the chopper switch and the disconnecting switch to be off in a case that the chopper voltage control signal is turning off the chopper switch;
      detect the auxiliary source voltage, compare the auxiliary source voltage with the preset voltage, output a signal to control the chopper switch to be off in a case that the auxiliary source voltage is lower than a set lower limit value and the chopper voltage control signal is not turning off the chopper switch, and output a signal to control the chopper switch to be on in a case that the auxiliary source voltage is higher than a set upper limit value and the chopper voltage control signal is not turning off the chopper switch; and the disconnecting switch driving circuit is configured to control the disconnecting switch to be on in a case that the chopper switch is off and the chopper voltage control signal is not turning off the chopper switch;

or, wherein the control device comprises a judging circuit, a logic circuit and a disconnecting switch driving circuit, the judging circuit is configured to detect the auxiliary source voltage, compare the auxiliary source voltage with the preset voltage, output a first signal to the logic circuit in a case that the auxiliary source voltage is lower than a set lower limit value, and output a second signal to the logic circuit in a case that the auxiliary source voltage is higher than a set upper limit value;

the logic circuit is configured to: receive the chopper voltage control signal and control the disconnecting switch and the chopper switch to be off in a case that the chopper voltage control signal is turning off the chopper switch; receive an output signal of the judging circuit, control the chopper switch to be off in a case that the output signal of the judging circuit is the first signal, control the disconnecting switch to be off in a case that the output signal of the judging circuit is the second signal, and control the chopper switch to be on in a case that the output signal of the judging circuit is the second signal and the chopper voltage control signal is not turning off the chopper switch; and the disconnecting switch driving circuit is configured to control the disconnecting switch to be on in a case that the chopper switch is off, the chopper voltage control signal is not turning off the chopper switch, and the output signal of the judging circuit is the first signal.

2. The auxiliary power supply circuit of the two-wire dimmer according to claim 1, wherein the judging circuit comprises a second resistor, a third resistor, a fourth resistor, a first comparator and a fifth resistor, an end of the second resistor, as an input end of the control device, is connected to a positive electrode of the auxiliary source capacitor, and an end of the third resistor is connected to the ground;

the other end of the second resistor and the other end of the third resistor are connected to a non-inverted input end of the first comparator, an inverted input end of the first comparator is connected to a reference voltage, and the fourth resistor is connected between the non-inverted input end and an output end of the first comparator; and the output end of the first comparator is connected to an end of the fifth resistor, and the other end of the fifth resistor, as a first output end of the control device, is connected to a control end of the chopper switch, the disconnecting switch driving circuit comprises a first resistor, and wherein an end of the first resistor is connected to the chopper voltage control signal, and as a second output end of the control device, is connected to a control end of the disconnecting switch and the control end of the chopper switch, and the other end of the first resistor is connected to a high potential end of the disconnecting switch.

3. The auxiliary power supply circuit of the two-wire dimmer according to claim 1, wherein the judging circuit comprises an eighth resistor, a ninth resistor, a tenth resistor and a second comparator, a non-inverted input end of the second comparator is connected to a positive electrode of the auxiliary source capacitor via the ninth resistor, the non-inverted input end of the second comparator is connected to a negative electrode of the auxiliary source capacitor via the tenth resistor, the eighth resistor is connected between the non-inverted input end and an output end of the second comparator, and an inverted input end of the second comparator is connected to a reference voltage;

the logic circuit comprises a thirteenth diode, a fourteenth diode, a fifth transistor, a sixth resistor, a seventh resistor, an eleventh diode, a twelfth diode and a second auxiliary power supply, the output end of the second comparator is connected to a cathode of the thirteenth diode, and an anode of the thirteenth diode, as a first output end of the control device, is connected to a control end of the chopper switch, a cathode of the fourteenth diode is connected to an end of the sixth resistor and a collector of the fifth transistor, the other end of the sixth resistor is connected to a positive electrode of the second auxiliary power supply, an emitter of the fifth transistor is connected to the ground, and a base of the fifth transistor is connected to the output end of the second comparator, an end of the seventh resistor is connected to the anode of the thirteenth diode which is the control end of the chopper switch, and the other end of the seventh resistor is connected to the positive electrode of the second auxiliary power supply, and the first output end of the control device is connected to the chopper voltage control signal via the eleventh diode, and a control end of the disconnecting switch is connected to the chopper voltage control signal via the twelfth diode; and the disconnecting switch driving circuit comprises an eleventh resistor, a common end of the eleventh resistor and an anode of the fourteenth diode, as a second output end of the control device, is connected to the control end of the disconnecting switch, and the other end of the eleventh resistor is connected to a high potential end of the disconnecting switch.

4. The auxiliary power supply circuit of the two-wire dimmer according to claim 1, wherein the control device is further configured to receive a chopper period control signal, judge whether the chopper switch is in a chopper period according to the chopper period control signal, and output a signal to control the chopper switch and the disconnecting switch to be on or off according to a comparison result of the auxiliary source voltage with a preset voltage, a state of the chopper voltage control signal and whether the chopper switch being in the chopper period, to control charging of the auxiliary source capacitor.

5. The auxiliary power supply circuit of the two-wire dimmer according to claim 4, wherein the control device comprises a first judging circuit, a second judging circuit, a logic circuit and a disconnecting switch driving circuit, the first judging circuit is configured to detect the auxiliary source voltage, compare the auxiliary source voltage with the preset voltage, output a first signal to the logic circuit in a case that the auxiliary source voltage is lower than a set lower limit value, and output a second signal to the logic circuit in a case that the auxiliary source voltage is higher than a set upper limit value;

the second judging circuit is configured to detect the chopper period control signal, judge whether the chopper switch is in a chopper period according to the chopper period control signal, output a third signal to the logic circuit in a case that the chopper switch is in a chopper period, and output a fourth signal to the logic circuit in a case that the chopper switch is in a non-chopper period;

the logic circuit is configured to receive an output signal of the first judging circuit, an output signal of the second judging circuit and the chopper voltage control signal; control the chopper switch to be on in a case that the first judging circuit outputs the second signal and the chopper voltage control signal is not turning off the chopper switch or in a case that the second judging circuit outputs the third signal and the chopper voltage control signal is not turning off the chopper switch; control the chopper switch to be off in a case that the first judging circuit outputs the first signal and the second judging circuit outputs the fourth signal or in a case that the chopper voltage control signal is turning off the chopper switch; and control the disconnecting switch to be off in a case that the chopper voltage control signal is turning off the chopper switch; and the disconnecting switch driving circuit is configured to control the disconnecting switch to be on in a case that the chopper switch is off and the chopper voltage control signal is not turning off the chopper switch.

6. The auxiliary power supply circuit of the two-wire dimmer according to claim 5, wherein the first judging circuit comprises a thirteenth resistor, a fourteenth resistor, a fifteenth resistor, a sixteenth resistor and a third comparator, an end of the thirteenth resistor, as an input end of the control device, is connected to a positive electrode of the auxiliary source capacitor, and an end of the fourteenth resistor is connected to the ground, the other end of the thirteenth resistor and the other end of the fourteenth resistor are connected to a non-inverted input end of the third comparator, an inverted input end of the third comparator is connected to a reference voltage, and the fifteenth resistor is connected between the non-inverted input end and an output end of the third comparator, and the output end of the third comparator is connected to an end of the sixteenth resistor, and the other end of the sixteenth resistor is connected to an anode of a fifteenth diode;

the second judging circuit comprises a sixth transistor, a seventeenth resistor and a second auxiliary power supply, a base of the sixth transistor is connected to the chopper period control signal, an emitter of the sixth transistor is connected to the ground, a collector of the sixth transistor is connected to an end of the seventeenth resistor and an anode of a sixteenth diode, and the other end of the seventeenth resistor is connected to a positive electrode of the second auxiliary power supply;

the logic circuit comprises a twenty-fourth resistor, the fifteenth diode and the sixteenth diode, a cathode of the sixteenth diode and a cathode of the fifteenth diode are connected together, and as a first output end of the control device, are connected to a control end of the chopper switch and an end of the twenty-fourth resistor, and the other end of the twenty-fourth resistor is connected to the ground; and the disconnecting switch driving circuit comprises a twelfth resistor, an end of the twelfth resistor is connected to the chopper voltage control signal, and as a second output end of the control device, is connected to a control end of the disconnecting switch and the control end of the chopper switch, and the other end of the twelfth resistor is connected to a high potential end of the disconnecting switch.

* * * * *